US007109989B2

(12) United States Patent
Bissell et al.

(10) Patent No.: US 7,109,989 B2
(45) Date of Patent: Sep. 19, 2006

(54) IMAGING VOLUME DATA

(75) Inventors: Andrew John Bissell, Edinburgh (GB); Pavlos Papageorgiou, Edinburgh (GB)

(73) Assignee: Voxar Limited, Edinburgh (GB)

( * ) Notice: Subject to any disclaimer, the term of this patent is extended or adjusted under 35 U.S.C. 154(b) by 427 days.

(21) Appl. No.: 10/257,123

(22) PCT Filed: Apr. 6, 2001

(86) PCT No.: PCT/GB01/01578

§ 371 (c)(1),
(2), (4) Date: Mar. 11, 2003

(87) PCT Pub. No.: WO01/78013

PCT Pub. Date: Oct. 18, 2001

(65) Prior Publication Data

US 2003/0156746 A1   Aug. 21, 2003

(30) Foreign Application Priority Data

Apr. 10, 2000 (GB) ................................. 0008799.9

(51) Int. Cl.
*G06T 17/00* (2006.01)
(52) U.S. Cl. ...................... 345/424; 345/419; 345/423; 382/128; 382/131
(58) Field of Classification Search ................ 345/423, 345/424, 419; 382/128, 131
See application file for complete search history.

(56) References Cited

U.S. PATENT DOCUMENTS

| 5,295,488 A | 3/1994 | Lloyd et al. |
| 5,544,283 A | 8/1996 | Kaufman et al. |
| 5,625,760 A | 4/1997 | Fujita |
| 5,787,889 A | 8/1998 | Edwards et al. |

| 6,674,430 B1 * | 1/2004 | Kaufman et al. ........... 345/419 |

FOREIGN PATENT DOCUMENTS

EP   1 001 377   5/2000

OTHER PUBLICATIONS

Lacroute et al. "Fast Volume Rendering Using a Shear-Warp Factorization of the Viewing Transformation", ACM 1994, pp. 451-458.*
Sommer, O. et al. "An interactive visualization and navigation tool for medical volume data." *Computers and Graphics.* 23:2, 233-244 (1999).
Wang, W. et al. "Accelerating techniques in volume rendering of irregular data." *Computers and Graphics.* 21:3, 289-295 (1997).

* cited by examiner

*Primary Examiner*—Kimbinh T. Nguyen
(74) *Attorney, Agent, or Firm*—Renner, Otto, Boisselle & Sklar, LLP

(57) ABSTRACT

A computer program and a computer-implemented system and method for generating a two-dimensional image of a volume data set representing an object volume from a selectable viewpoint. An object volume data set includes voxel values ordered by voxels along a row that extends in a first direction, rows across a plane that extends in the first direction and a second direction, and planes through an object volume that extend in the first and second directions and a third direction. In response to the definition of a view vector defining a view direction with respect to a viewpoint, shear and warp mappings are determined, as is which of the first, second and third directions is closest to the view vector. Pixels of a two-dimensional sheared image having a plurality of lines of pixels are then determined from voxel values of the object volume data set identified by the shear mapping. Where the view vector is closest to the first direction, the shear mapping maps rows of voxels in the first direction onto lines of pixels of the sheared image. An output image is then determined by mapping pixels of the sheared image according to the warp mapping. This output image can be displayed, printed, sent to a remote location or otherwise communicated to a user.

49 Claims, 14 Drawing Sheets

IMAGING VOLUME DATA

This application is a national phase of International Application No. PCT/GB01/01578 filed on Apr. 6, 2001, which was published in the English language under Publication No. WO 01/78013.

BACKGROUND OF TH INVENTION

The present invention relates to imaging three-dimensional voxel data. In particular, the invention relates to the imaging of three-dimensional voxel data with respect to a desired viewpoint and view direction.

The imaging of three-dimensional objects is often referred to as volume rendering. Volume rendering finds applications in many fields. One such field is the rendering of medical data resulting, for example, from the scanning of the human or animal body using computer tomographs and other X-ray scanners, nuclear magnetic resonance scanners and ultrasound scanners, to name but a few examples.

The three-dimensional voxel data generated by modern scanning equipment can be very detailed and complex to interpret. For a physician to be able to make effective use of such scan data, it is desirable to provide tools that can readily be manipulated in real-time. A physician may wish to render the data from different directions and from different positions with respect to the scanned object in order to be able to analyse the scanned object and to detect, for example, abnormalities. The physician may wish to simulate rotation of the scanned object or navigation through the scanned object, generating images in real-time as the translations and rotations are effected. In order to provide relatively smooth motion effects, and simply to provide effective response times, rapid real-time rendering is desirable. Also, it is desirable to enable such rapid, real-time rendering on conventional computer workstations, for example a personal computer.

Many techniques are known for rendering three-dimensional voxel data.

One such technique employs a rotate-warp algorithm [1].

Another such technique [2] employs a shear-warp algorithm and is known as shear-warp factorisation. In this approach, a viewing transformation matrix is factorised into a 3D shear that is parallel to slices of a reference volume an a 2D warp to produce a projection of the sheared volume. Although the shear-warp factorisation provides for relatively efficient three-dimensional rendering when the object is viewed from certain directions, the processing is significantly slower from other viewing directions.

Accordingly, an object of the present invention is to provide improved rendering of three-dimensional objects that can provide rendering that is generally faster and less direction-dependent than conventional shear-warp processing, and preferably permits real-time rendering on conventional personal computer hardware.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

One aspect of the invention provides a computer-implemented method of generating a two-dimensional image of a volume data set representing an object volume from a selectable viewpoint. The method includes the provision, in storage, of an object volume data set. The object volume data set comprises voxel values ordered by voxels along a row that extends in a first direction, rows across a plane that extends in the first direction and a second direction, and planes through an object volume that extends in the first and second directions and a third direction. In response to definition of a view vector defining a view direction with respect to a viewpoint, shear and warp mappings are determined, and one of the first, second and third directions is determined as being closest to (i.e., forming the smallest angle with respect to) the view vector. Pixels of a two-dimensional sheared image, the sheared image having a plurality of lines of pixels, are then derived from voxel values of the object volume data set identified by the shear mapping. The shear mapping maps rows of voxels in the first direction onto lines of pixels of the sheared image. An output image can then be derived by mapping pixels of the sheared image according to the warp mapping.

In this way, when the view vector is closest to the first direction, sequential memory access is still possible. This contrasts to conventional shear-warp methods where it is impossible to provide sequential memory access in all view vector orientations.

More specifically, by aligning the rows of voxels from the first direction with lines of the sheared image, contiguous blocks of voxels can be retrieved from storage in a manner that is consistent with the storage of those voxels in memory. Processing primarily in accordance with the organisation of the voxel data rather than in the order in which the pixels of an image to be displayed is counter-intuitive, but leads to more efficient processing as better use can be made of the storage retrieval processes typically used in computer systems. Where a memory access is made, it is now conventional to retrieve a block or run of contiguous memory locations. This is partly due to the construction of memory chips, partly due to the use of cache memories and partly to optimise bus usage. By ordering processing dependent upon the order of storing voxels, it is more likely that successive voxel values needed to accumulate a line of the sheared image will be available in a block of retrieved data.

In a preferred embodiment of the invention, irrespective of which direction is closest to the view vector, the shear mapping maps rows of voxels in the first direction onto lines of pixels of the sheared image, whereby the benefits mentioned above apply for any orientation of the view vector with respect to the object to be rendered.

In an embodiment of the invention, the volume data set is held in main storage, and blocks of contiguously ordered voxel values being processed are temporarily transferred from main storage to cache memory. The generation of the pixels of the two-dimensional sheared image is preferably performed line by line of the sheared image. A cache memory could be operable to hold all data required for processing at least one scan line of the two-dimensional image sheared in memory. A sheared image buffer is provided for the accumulation of one line at a time of the sheared image. In an embodiment of the invention, a sheared image buffer for a line of pixel data is a first-level cache memory of a microprocessor. Thus, for example, in an embodiment of the invention, a second level cache could hold all rows of voxel data for generating a line of the sheared image and a first level cache could hold all pixels of the line of pixels of the sheared image. In this manner, particularly efficient processing is possible by effective use of memory resources.

The derivation of a line of pixels of the sheared image includes identifying one or more rows of voxels in the first direction that map onto the line of pixels of the sheared image, and accumulating contributions from voxels from said one or more rows of voxels to derive respective pixel values of the line of pixels of the sheared image. In a preferred embodiment, a record is made of the relationship between successive rows of voxels that contribute to a line of pixels. The same relationships between rows can apply for any pixel of the sheared image. Therefore a record (for example in the form of a table) can be used to identify the voxels that contribute to any pixel of the sheared image.

The accumulation of contributions for a pixel of the sheared image is terminated when a value representative of a predetermined intensity or opacity is reached. This approach is a bit like "early ray termination" to avoid unnecessary processing of voxels that will not contribute to a pixel of the sheared image, for example because the pixel has already reached a maximum intensity.

To also improve processing efficiency, pre-processing of the volume data set can be employed to identify voxels having values that exceed a predetermined degree of opacity. The pre-processing can include generating a volume data set encoded as runs of values having opacities greater than said predetermined opacity separated by skip lengths. Alternatively, the pre-processing can involve the generation of a record indicating the allocation of the voxels having opacity values greater than the predetermined opacity. During generation of the sheared image, voxels with voxel values less than or equal to the predetermined value can be ignored during the accumulation of pixel values to avoid generating unnecessary computations and memory accesses.

The invention finds particular application to the rendering of scanned data, for example medical scan data, seismic data, non-destructive testing data, etc. Such data can be generated by one or more of the following scanning techniques, by way of example only: particle and/or electromagnetic energy scanning, sound or ultrasound scanning.

Another aspect of the invention provides a computer program product comprising computer code, which, when stored in the memory of a computer, is operable to control the processor of the computer to implement a method as set out above. The computer program code can be provided on a carrier medium. The carrier medium can, for example, be a storage medium. Alternatively, it can be a transmission medium.

A further aspect of the invention provides a system for generating a two-dimensional image of a volume data set representing an object volume from a selectable viewpoint. The system includes storage for an object volume data set. The volume data set comprises values ordered by voxels along a row that extends in a first direction, rows across a plane that extends in the first direction and a second direction, and planes through an object volume that extends in the first and second directions and a third direction. A view processor is operable to determine, in response to definition of a view vector defining a view direction with respect to a viewpoint, shear and warp mappings and determining one of the first, second and third directions as being closest to the view vector. A shear processor is operable to derive pixels of a two-dimensional sheared image having a plurality of lines of pixels from voxel values of the object volume data set identified by the shear mapping. The shear mapping maps rows of voxels in the first direction onto lines of pixels of the sheared image. A warp processor is operable to derive an output image by mapping pixels of the sheared image according to the warp mapping.

According to another aspect of the invention there is provided a computer-implemented method of generating a two-dimensional output image from an object volume data set, the method comprising:
  (a) providing an object volume data set comprising voxel values ordered by voxels along a row that extends in a first direction, rows across a plane that extends in the first direction and a second direction, and planes through an object volume that extends in the first and second directions and a third direction;
  (b) providing a view vector and a viewpoint, defining a view direction according to the view vector and the viewpoint, and determining one of the first, second and third directions as being closest to the view vector;
  (c) determining a shear mapping from the object volume data set to a two-dimensional sheared image;
  (d) determining a warp mapping from the two-dimensional sheared image to a two-dimensional output image;
  (e) deriving pixels of a two-dimensional sheared image having a plurality of lines of pixels from voxel values of the object volume data set identified by the shear mapping, wherein the shear mapping maps rows of voxels in the first direction onto lines of pixels of the sheared image; and
  (f) deriving the two-dimensional output image by mapping pixels of the sheared image according to the warp mapping.

One or more of the view processor, the shear processor and the warp processor can be implemented, partially or wholly, by software controlling the operation of general purpose hardware. However, one or more of the view processor, the shear processor and the warp processor can equally be implemented, partially or wholly, by special purpose hardware, for example by an Application Specific Integrated Circuit (ASIC) or other appropriate technology.

BRIEF DESCRIPTION OF THE DRAWINGS

An exemplary embodiment of the present invention will be described hereinafter, by way of example only, with reference to the accompanying drawings in which like reference signs relate to like elements and in which.

DETAILED DESCRIPTION

An embodiment of the present invention will be described hereinafter and in the context of a computer-implemented system, method and computer program product for the imaging of three-dimensional voxel data.

Figure 1:
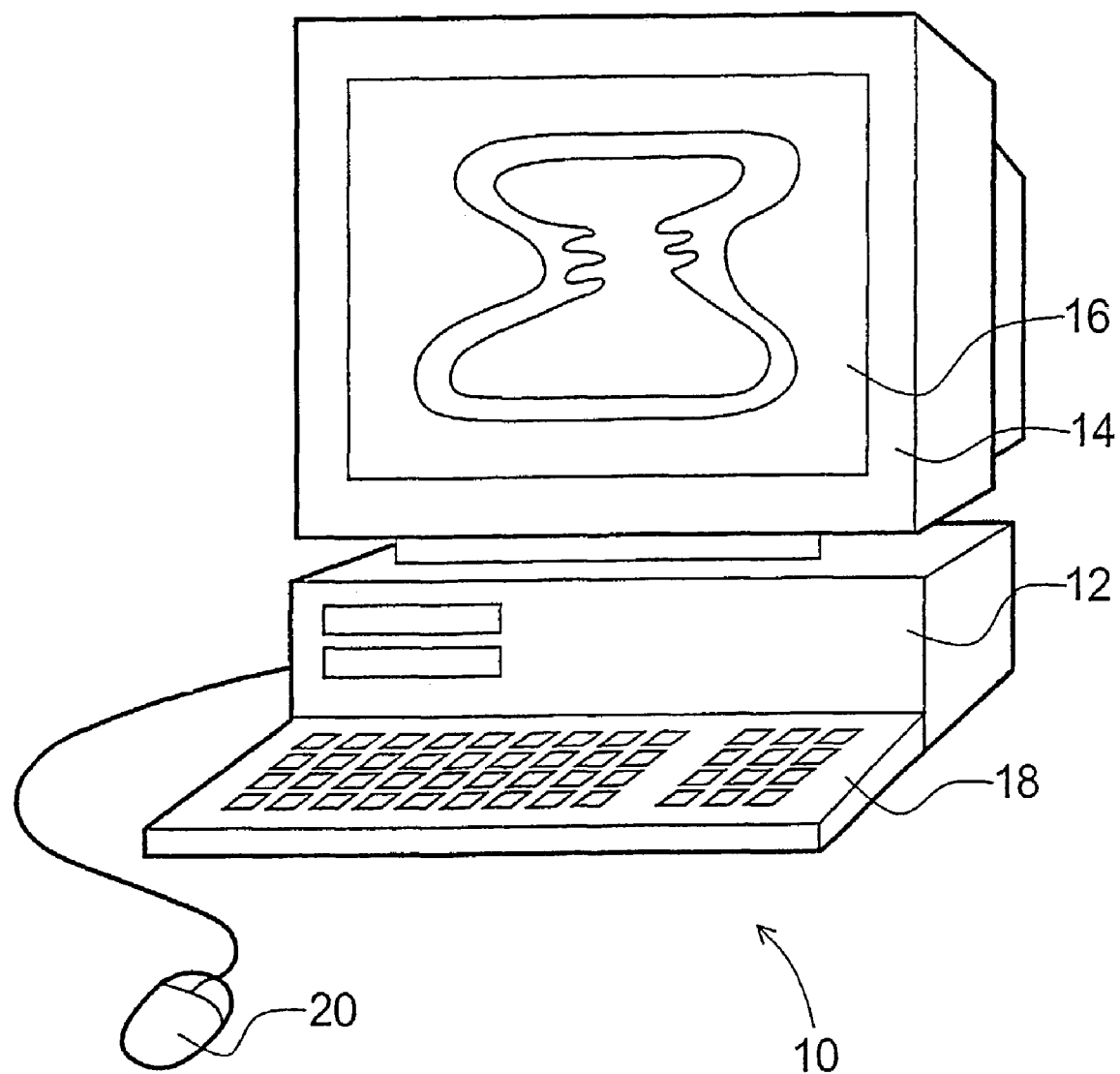
FIG. 1 is a schematic representation of a computer workstation for an embodiment of the invention.

FIG. 1 is a schematic representation of a computer workstation used to provide one embodiment of the present invention. Although the present embodiment is described in terms of a computer program product that causes a computer, for example a personal computer or other form of workstation, to provide the functionality required an embodiment of the invention, it will be appreciated from the following description that this relates to one example, only, of an embodiment of the present invention. For example, in an embodiment of the invention, a network of computers, rather than a stand-alone computer, may implement an embodiment of the invention. Alternatively, or in addition, at least some of the functionality of the invention may be implemented by means of special purpose hardware, for example in the form of special purpose integrated circuits (e.g., Application Specific Integrated Circuits (ASICs)).

As shown in FIG. 1, the computer workstation 10 includes a system unit 12, a display 14 (as shown displaying a two-dimensional image derived from three-dimensional voxel data in accordance with an example of the invention), a keyboard 18 and a mouse 20.

Figure 2:
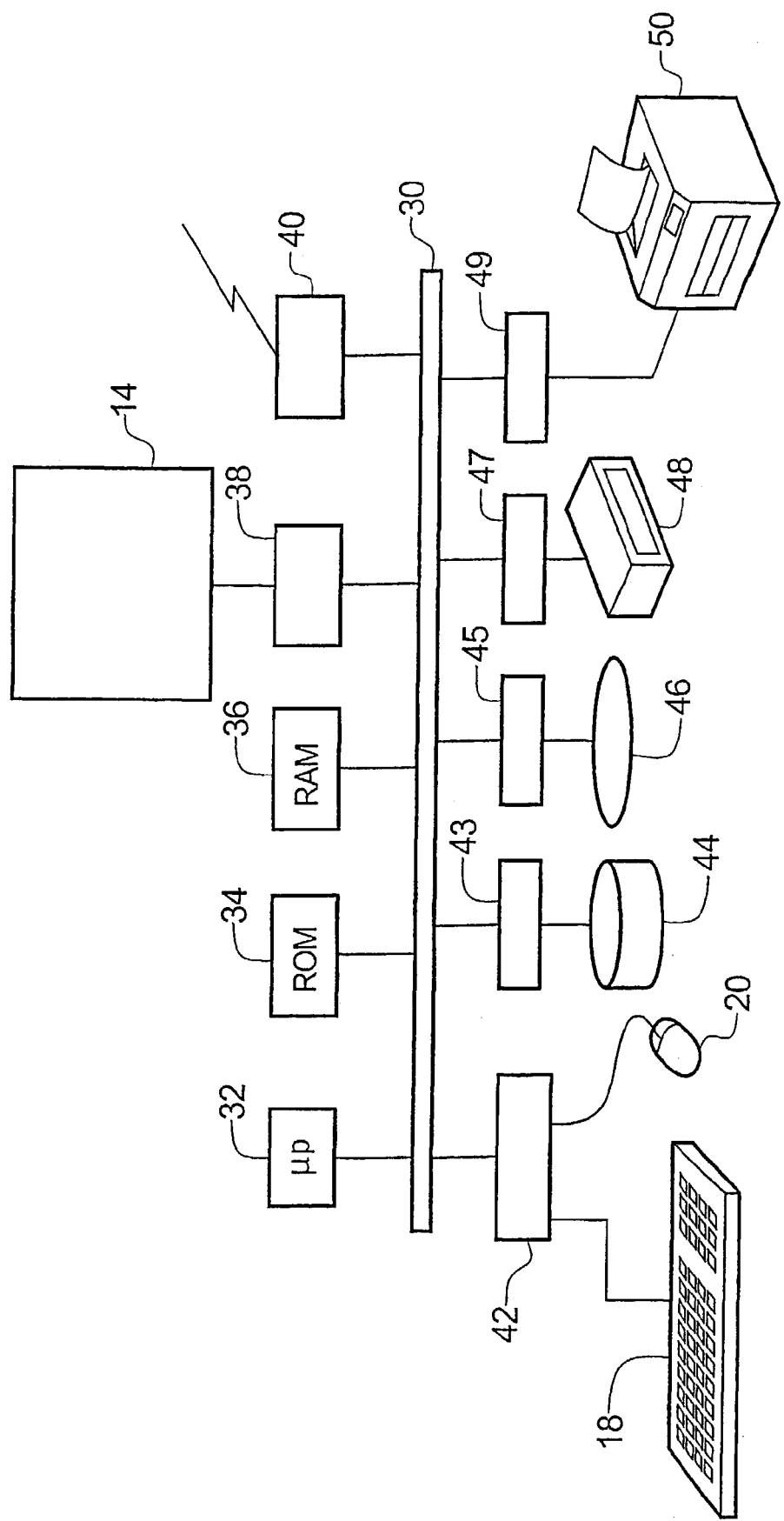
FIG. 2 is a schematic block diagram illustrating an example of a hardware configuration of a workstation as illustrated in FIG. 1.

FIG. 2 is schematic block diagram illustrating an exemplary configuration of a computer workstation 10 as shown in FIG. 1.

As shown in FIG. 2, the computer workstation 10 includes a bus 30 to which a number of units are connected. A microprocessor (CPU) 32 is connected to the bus 30. Read only memory 34 and random access memory 36 are also connected to the bus 30. A display adapter 38 connects the display 14 to the bus 30. A communications interface 40, for example a network interface and/or a telephonic interface such as a modem, ISDN or optical interface, enables the computer workstation 10 to be connected to other computers via, for example, an intranet or the Internet. An input device interface 42 connects one or more input devices, for example the keyboard 18 and the mouse 20, to the bus 30. A storage interface 43 enables access to a hard disk 44. An optical drive interface 45 provides access to a CD ROM 46 or the like, and a floppy drive interface 47 provides access to a floppy disk drive 48. A printer interface 49 also connects a printer 50. It will be appreciated that one or more of the components illustrated in FIG. 4 may be omitted and/or additional components may be provided, as required for a particular implementation.

Figure 3:
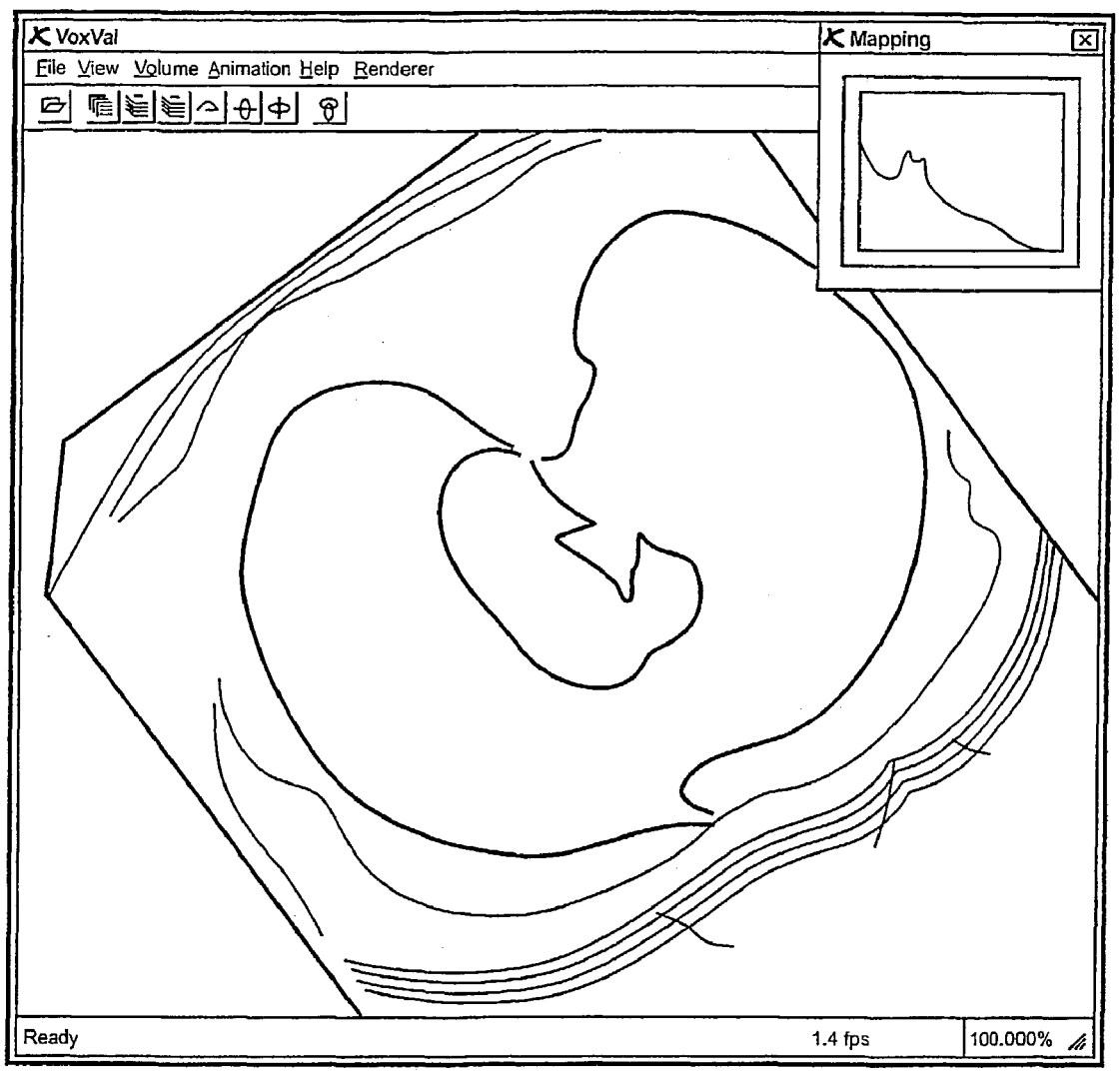
FIG. 3 is an illustration of an example of an image that can be output by an example of the invention.

FIG. 3 is a schematic representation of a typical image than can be generated with an embodiment of the invention.

Figure 4:
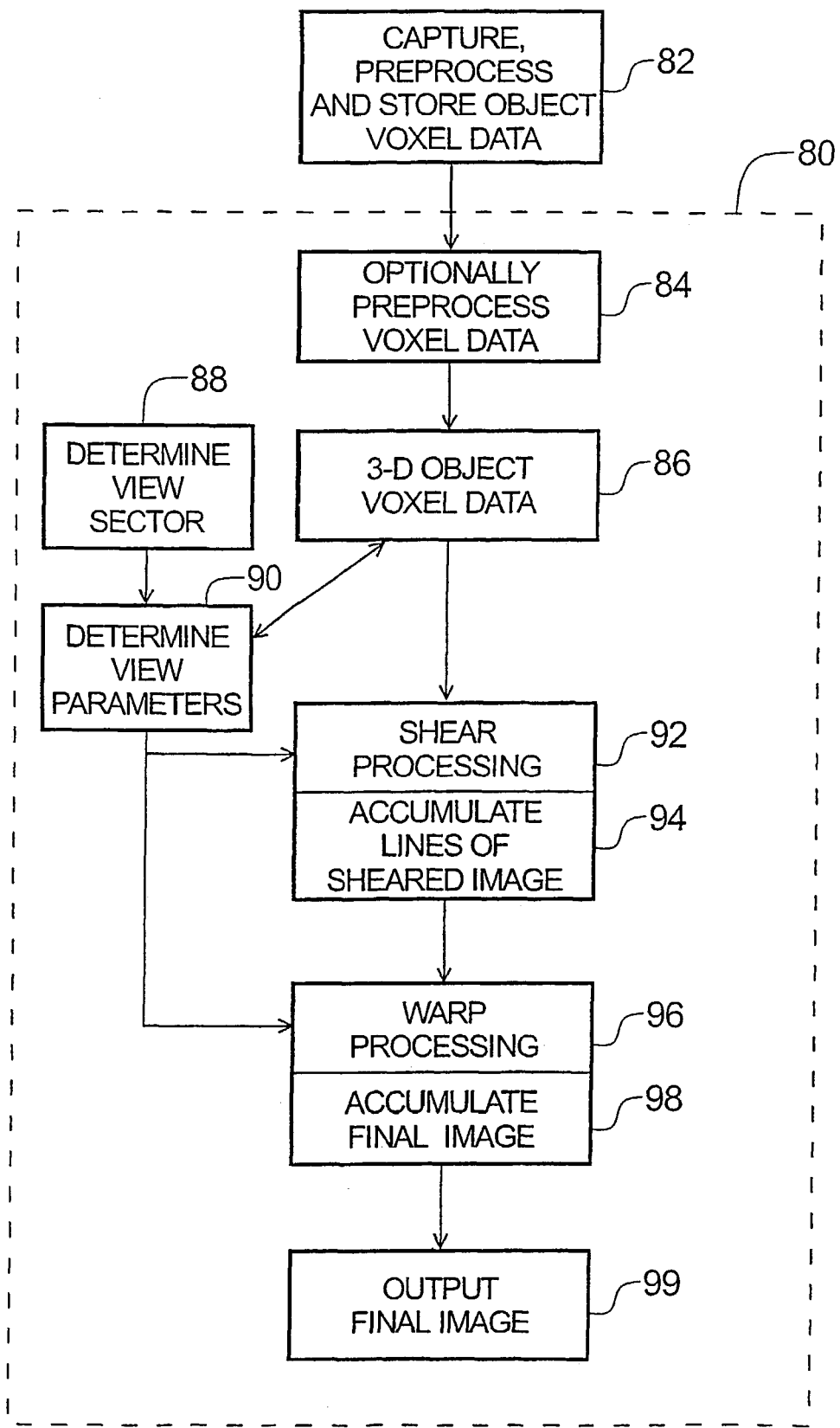
FIG. 4 is a schematic representation of various stages of a process of imaging three-dimensional voxel data in accordance with the invention.

FIG. 4 is an overview of the processing stages 80 in operating an embodiment of the invention.

In pre-processing operations, original object volume data is captured in Step 82 by suitable voxel data capture apparatus. This could be formed, for example, by a computer tomographic scanner, a nuclear resonance scanner, an ultrasound scanner, etc. The captured image data is pre-processed to generate volume data in the form of a three-dimensional array of voxel data. This data can be stored directly to generate the 3-D object voxel data as identified at Step 86 in FIG. 4. Alternatively, further pre-processing of that image data can be performed in Step 84 as will be described in more detail later.

The data is stored in Step 86 in volume data storage as a volume data set representing voxel values. The voxel values are ordered by voxels along a row that extends in a first direction, rows across a plane that extends in the first direction and a second direction, and planes through a volume that extends in the first and second directions and a third direction. Thus the voxel data is ordered by voxels within a row, rows within a plane (or slice) and planes within a volume. The voxel data is stored in memory in essentially this order, although, as will be explained later, various enhancements to the storage methodology can be employed to enhance efficiency.

Once the basic object voxel data is stored, processing of that data in accordance with an embodiment of the invention may proceed.

In Step 88, a view vector (view point and direction) is determined. This could be performed by some automated process, for example by a program operable to generate a video comprising a series of views, or alternatively by a user using conventional input devices such as the keyboard 18 and mouse 20 shown in FIG. 1.

Once the view vector has been determined, a computation is made in Step 90 as to the relationship between the view vector and the co-ordinates axes of the co-ordinate system in which the object is defined. In order to achieve this, the view vector is expressed as a view matrix in a conventional manner. Appropriate shear and warp parameters are then determined, as described later, for processing the voxel data to derive a two-dimensional image of the object as viewed along the view vector.

In Step 92, successive lines of the two-dimensional sheared image representation of the object represented by the voxel data are computed and the results are stored in Step 94, line-by-line, in 2-D sheared image storage 94.

In Step 96, the lines of the sheared image representation from the sheared image storage are then warped to generate the desired 2-dimensional image of the object represented by the voxel data as viewed along the view vector. The final image is accumulated in Step 98 in to final image storage, which can be stored in main storage.

For the skilled person, it will be appreciated that the overall processing strategy is similar to that employed in conventional shear-warp processing. However, there are significant differences between conventional shear-warp processing and processing in accordance with an embodiment of the invention. These differences provide significant technical advantages as will become apparent from the following. In particular, in an embodiment of the invention, processing of the voxel data to generate the sheared image representation is chosen to optimise the access to the voxel data from memory, thus significantly improving processing efficiency and the use of the available system resources.

Figure 5:
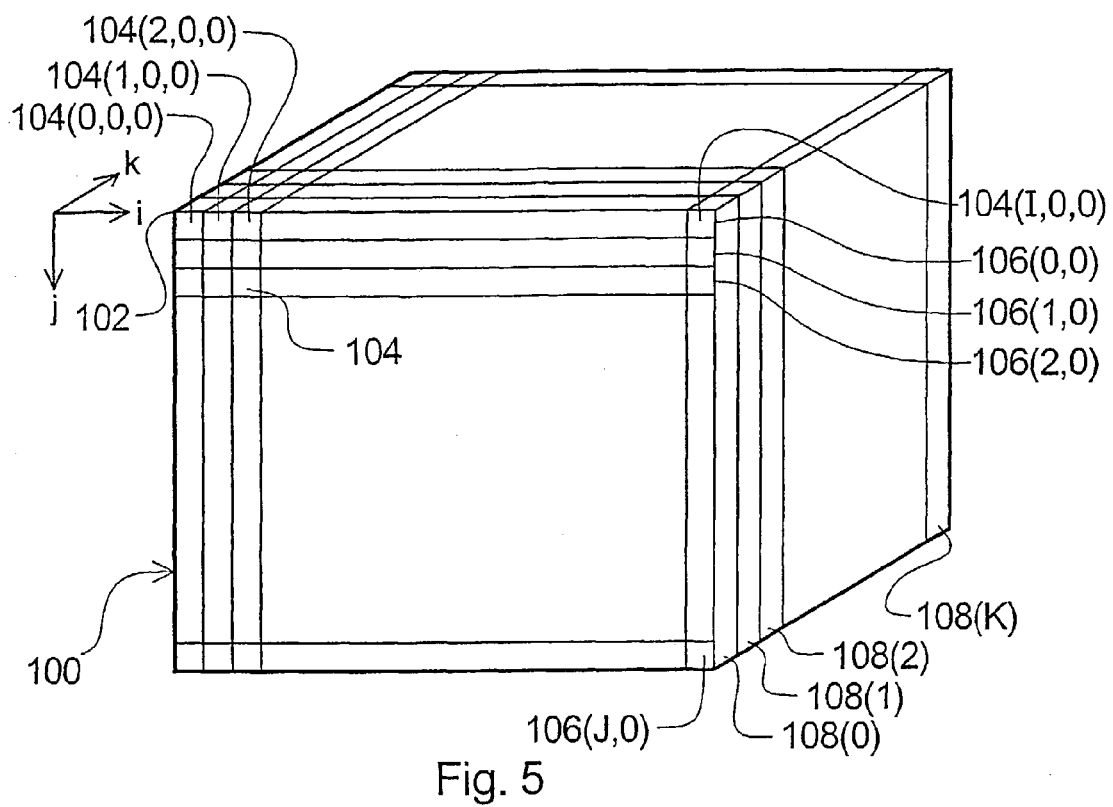
FIG. 5 is a schematic representation of a three-dimensional array of voxels to be imaged.

FIG. 5 is a schematic representation of the voxel data that makes up a volume data set 100 of an object to be imaged. FIG. 5 attempts to represent a three-dimensional array of voxels 104 with respect to i, j and k axes, with the origin at the top, left, front corner 102. Each voxel 104 is associated with one or more values representative of that volume in space. The value or values can relate to the intensity of the voxel, for example relating to the density of that volume in space. However, the value or values could, for example, relate to values derived from a scan of the object in space as some function of the scanned values. For example, they could represent the opaqueness (opacity), or transparency, colour, etc, of the volume in space. For simplicity, in the following, reference will be made to an opacity value, although it should be understood that this could alternatively be a transparency value, or for example a density value, as appropriate. Also, for convenience of explanation only, the terms voxels, rows, planes (or slices) and object volume are defined with reference to the disposition of the object space as shown in FIG. 5, although it should be appreciated that other definitions could be given.

A line of voxels (say 104(0,0,0), 104(1,0,0), 104(2,0,0), . . . , 104(I,0,0)) extending horizontally, as shown in FIG. 5, form a row (say 106(1,0)). A series of rows (say 106(0,0), 106(1,0), 106(2,0), . . . , 106(J,0)) extending perpendicularly to the rows in a vertical direction, as shown in FIG. 5, form a plane (or slice) (say 108(0)). A series of planes (say 108(0), 108(1), 108(2), . . . , 108(K)) extending perpendicularly to the rows and planes perpendicularly to the plane of the page, as shown in FIG. 5, form an object volume 100.

Figure 6:
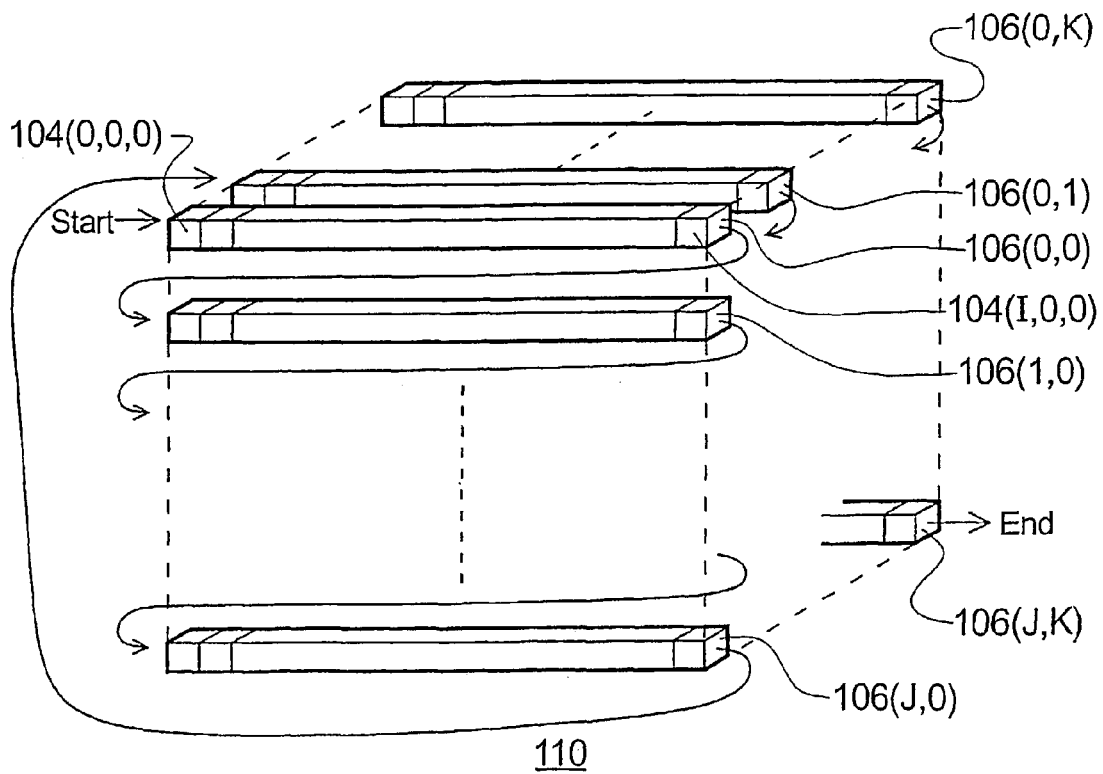
FIG. 6 illustrates a run-skip storage methodology for voxel data.

FIG. 6 shows one storage methodology for the voxel data in the volume data storage 86. In this simple storage methodology, successive values for each of the voxels (104(0,0,0)–104(I,0,0)) from left to right as illustrated in FIGS. 5 and 6 along the horizontal row 106(0,0) at the top and front of the volume are stored in sequential addresses in storage. After this, successive voxel values from left to right for the row 106(1,0) below the first row are stored in the next set of addresses in storage. This then continues down the front plane 108(0) of the object volume 100. At the bottom right of the front plane 108(0) of the voxel data, the same approach to voxel data storage is applied for the plane 108(1) behind the front plane, as so on for the whole object volume.

It is to be noted at this stage, that conventional computer technology, especially with the use of cache storage means that significant gains in processing efficiency can be made where data required for processing is to be found in contiguous storage locations in memory. Where a memory access is made, it is conventional to retrieve a block or run of contiguous memory locations. This is partly due to the construction of memory chips, partly due to the use of cache memories and partly to optimise bus usage.

Conventional shear-warp processing is based on generating the pixel values of a sheared image in a number of passes. Where the view direction is nearest to either the second (j) or third (k) axes, then the algorithm could employ relatively efficient access to the voxel data. However, where the view vector is nearest in orientation to the first (i) axis, inefficient access to the voxel data is necessary resulting in significantly slower image generation. An embodiment of the invention avoids such a slow axis, by employing a different, and more efficient approach to sheared image data generation, in at least the axis where the view vector is nearest to the first (i) axis.

The methodology employed by the present invention will be described in more detail below. However, before proceeding to a fuller description, reference is made to FIG. 7, which illustrates a run-skip approach to storage of a working subset of the voxel data of the volume data set. In the initial, optional pre-processing Step 84 shown in FIG. 4, the voxel data illustrated with reference to FIGS. 5 and 6 can be processed to remove pixels having an opacity value of below a given threshold. A revised representation of the object can be stored as a starting point at Step 86 for processing with voxels that are less opaque than the threshold deleted and replaced by a count of the deleted voxels. As a result, the revised object volume representation 110 will include, say, a run of voxels 112, followed by a skip value 114 given a voxel count to the next run of voxels 116, followed by a skip value 118 given as a count of voxels, and so on. The same basic ordering of voxels as described with reference to FIG. 6 is employed, with the voxel ordering being by voxels within a row, rows within a plane and planes within the object volume to form the complete object volume 110. The reduction in data to be accessed for processing results in a reduction in bus bandwidth needed and accordingly to a reduction in processing time. Typically, the threshold taken for the opacity value is taken at or below the lowest level of opacity of potential interest, in order that the working sub-set of FIG. 7 is effectively complete, as least as far as any anticipated processing is concerned.

Figure 7:
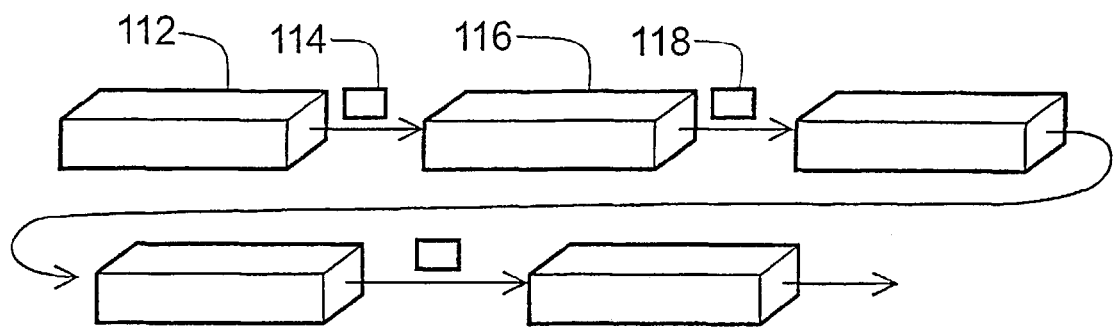
FIG. 7 illustrates an alternative storage methodology for voxel data.
Figure 8:
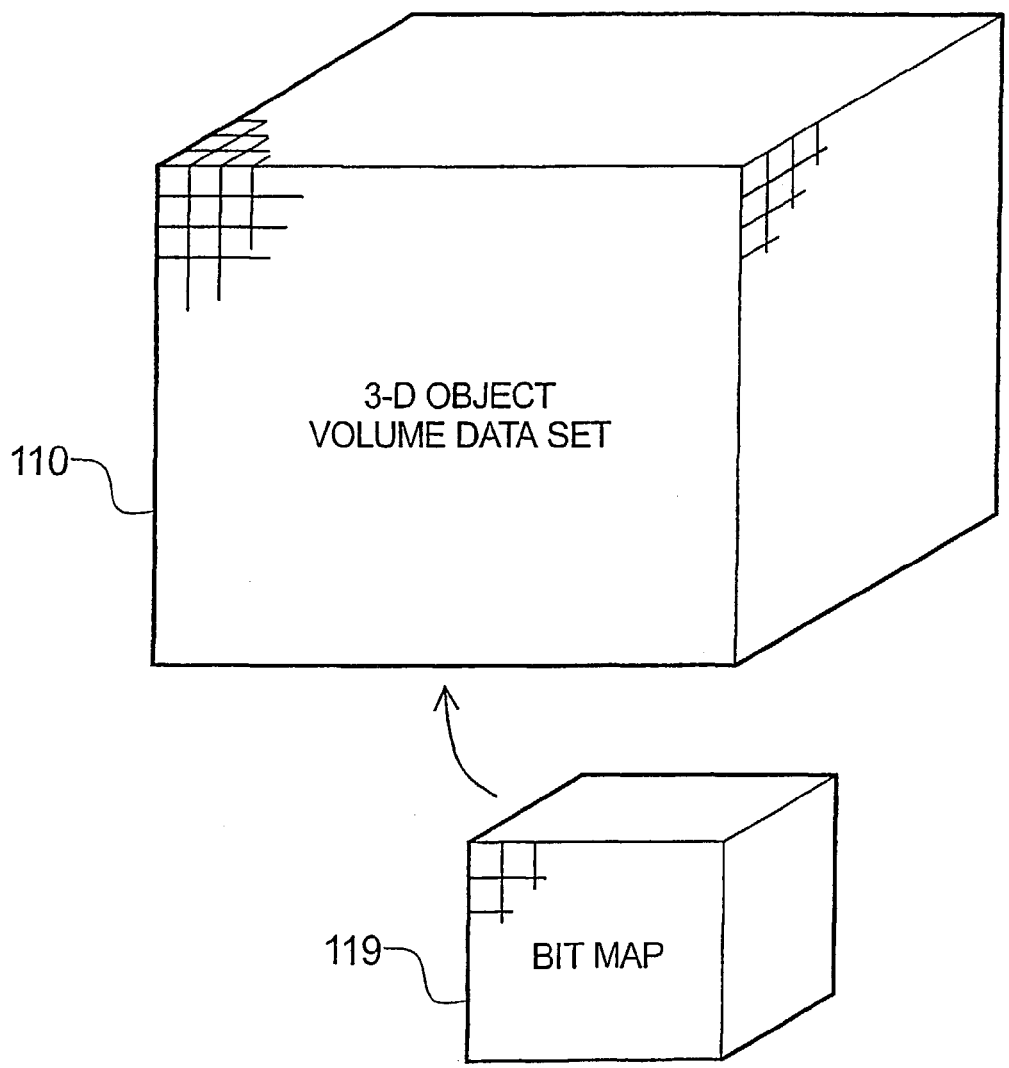
FIG. 8 illustrates a shear processing stage of the process of FIG. 4 in more detail.

FIG. 8 represents an alternative to the representation in FIG. 7. In this case, the full object data 110 is retained. A further array 119 in the form of a bit map comprising one bit for each voxel is defined in storage. Each bit is either set to one value (say 1) where the corresponding voxel is above the opacity threshold or set to another value (say 0) where the corresponding voxel is below the opacity threshold. By only accessing voxels with significant data, this approach can also result in a reduction in bus bandwidth needed and a reduction in processing time.

As further alternative, the 3-D volume data set 110 and/or the bit map 119 could be stored using a run-skip approach. Where a run-skip approach is adopted for the 3-D volume data set 110, the bit map identifies the runs of bits that are retained using one bit value, and the skipped values using another bit value. Where a run-skip approach is adopted for the bit map 119, the storage required for the bit map can also be reduced in a manner similar to that described with reference to FIG. 7. In a further example of a run-skip approach, a matrix of start and end pointers to the beginnings and ends of run-skip data sets are arranged on an i,j co-ordinate basis.

Figure 9A:
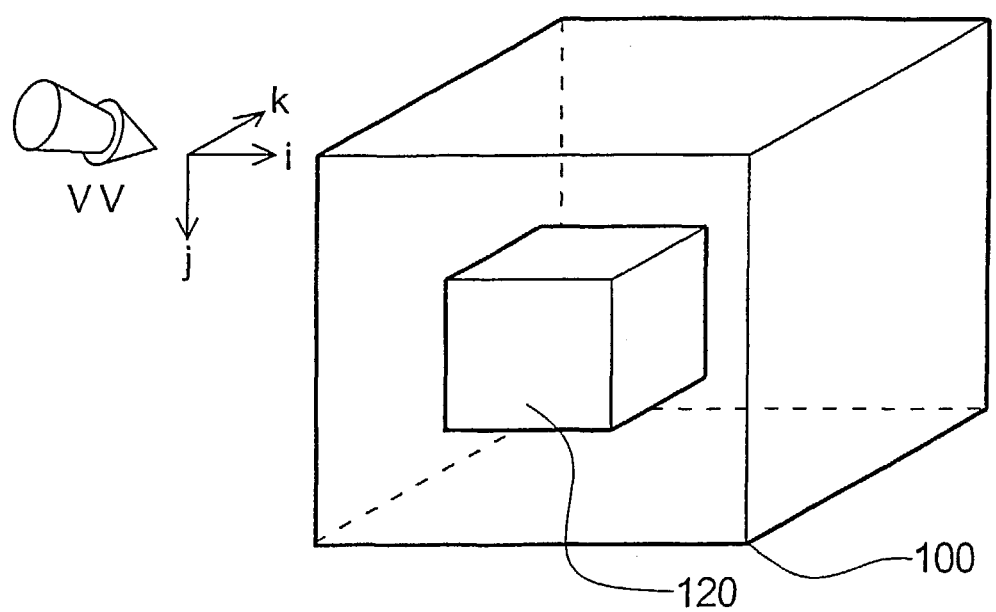
FIG. 9 illustrates stages in the rendering of three-dimensional voxel data.

There now follows a description of the operation of an embodiment of the invention for generating a two-dimensional image of a three-dimensional object FIG. 9A represents an object 120 in a region 100 in i,j, k object space 122. The region 100 corresponds to the object volume data set 100 stored at Step 86 in FIG. 4. An arbitrary view vector VV is also shown. This could comprises the full voxel data representation as described with reference to FIG. 6, or could comprise one of the alternative representations described with reference to FIG. 7 or 8, or some other alternative representation of the object volume data set 100 of FIG. 5. The actual data stored is typically derived as some function of the data that results from the scan of an object. The data can be opacity values, colour values, etc, rather than pure scan intensity values.

Figure 9B:
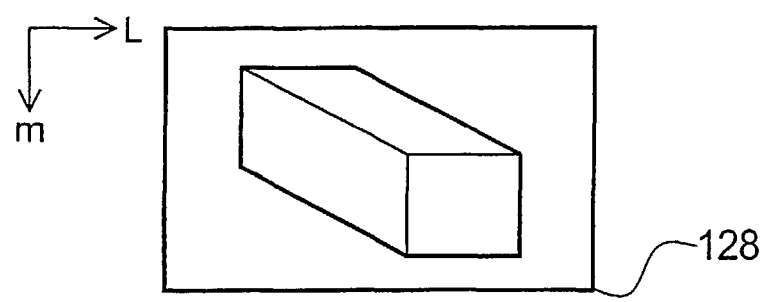

FIG. 9B represents a complete sheared two-dimensional image 130 representation in sheared image (l, m, n) space, corresponding to the sheared image storage in Step 94 in FIG. 4. The dimension n is orthogonal to l and m, that is n is perpendicular to the plane defined by l and m and is parallel to the view vector VV. The aim of the shearing operation in an embodiment of the invention is to provide a sheared image such that rows of voxels in the i direction always map onto lines of pixels of the sheared image in the l direction, in order to provide efficient processing.

Figure 9C:
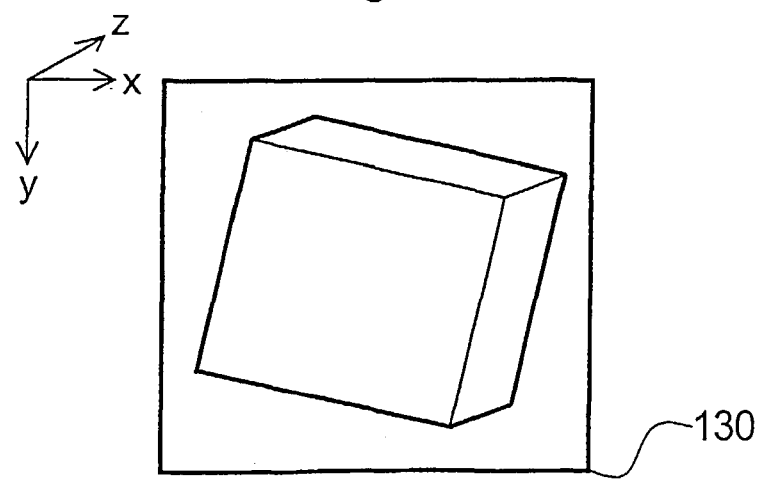

FIG. 9C represents the final two-dimensional image 130 in final image (x, y, z) space, corresponding to Step 98 in FIG. 4. It should be noted that n=z, and there is an affine transformation of l and m to x and y. The warp processing of Step 96 of FIG. 4 employs warp parameters determined in Step 90 of FIG. 4 to convert the sheared object representation into the final image representation.

Figure 10:
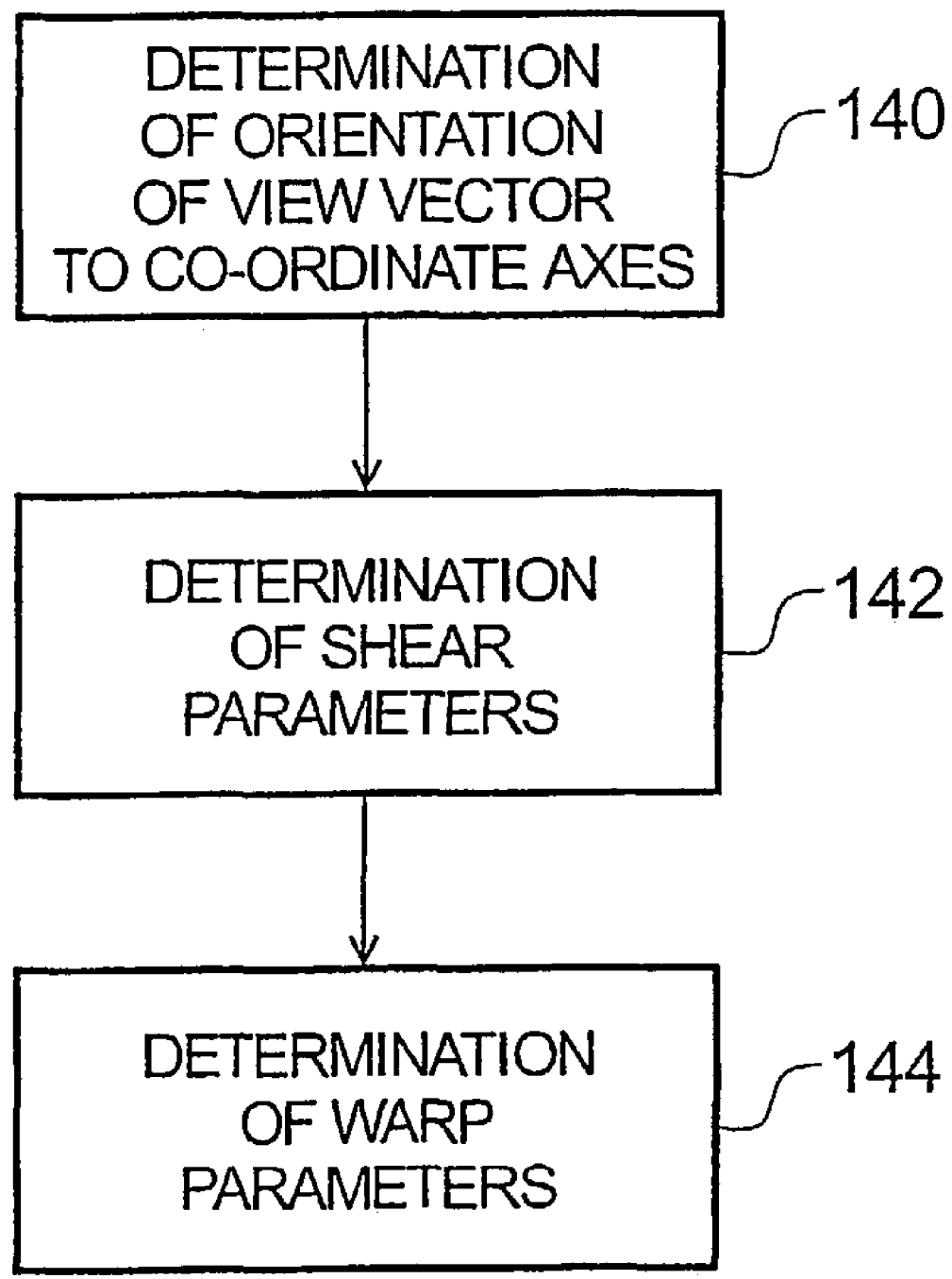
FIG. 10 illustrates steps in determining view parameters of the process of FIG. 4.

FIG. 10 is a flow diagram for describing Step 90 of FIG. 4 in more detail.

In Step 140, a determination is made which of the i, j and k axes of the object coordinate space has an orientation closest to the orientation of the view vector. This can be performed using conventional matrix computation by finding the dot product of the view vector with the respective ones of the i, j and k axes and determining the axis with an orientation closest to the view vector that provides the largest dot product with the view vector. The appropriate shear matrix can then be determined.

In Step 142, a shear matrix is determined such that the i axis of FIG. 9A maps onto the l axis of FIG. 9B, that is such that a rows of voxels in the i direction map onto lines of pixels in the sheared image. In this example, the rows of voxels in the i direction map onto horizontal rows of pixels in the scan direction l of the sheared image. The m and n axes are set to be orthogonal to each other and the l axis.

In Step 144, a warp matrix is generated for effecting a 2D warp transformation from the sheared image to the final image. Here the warp matrix is the product of the inverted shear matrix and the view matrix.

Although the present invention employs shear and warp stages, an embodiment of the present invention includes significant improvements with respect to the traditional shear warp technique. By providing a shear that maps rows of voxels onto rows of pixels positions in the sheared image, more efficient processing is possible, particularly where the view vector is closest to the i direction. This is because the voxels needed for contiguous pixels on a line of the sheared image are more likely to be found in contiguous storage locations in voxel storage.

The difference between the mapping performed in accordance with the invention, and the mapping employed by a traditional shear warp process, should be come more clear from the following description of FIG. 11. In each of FIGS. 11A to 11D, the view vector VV extends perpendicular to the plane of the drawing and into the drawing.

Figure 11A:
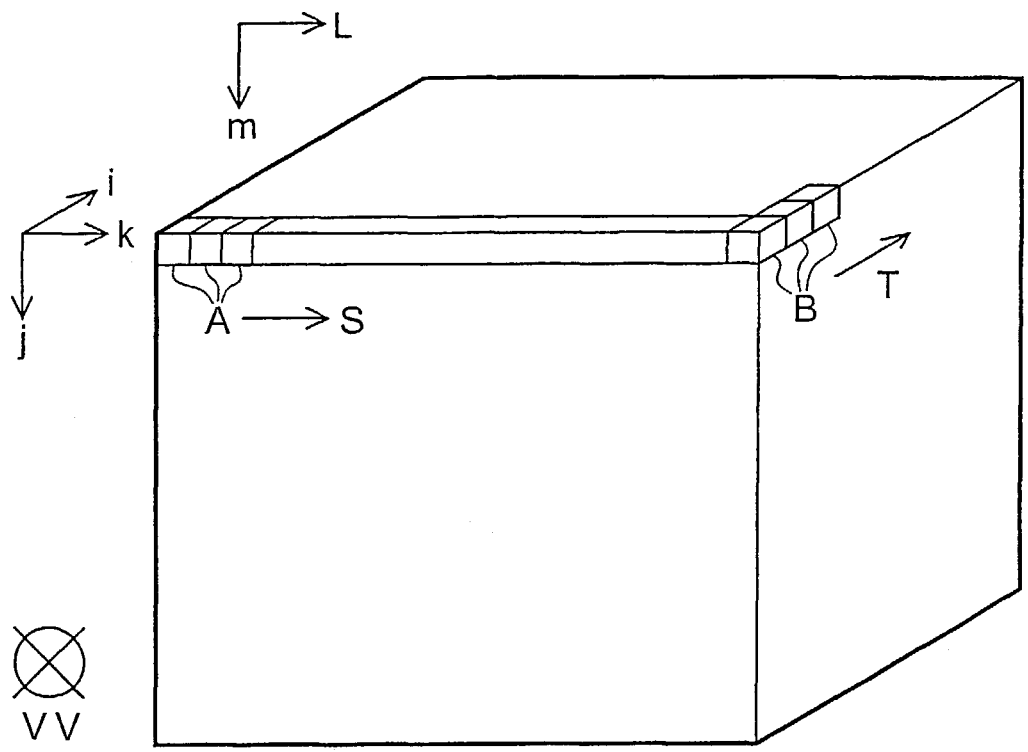
FIGS. 11A–11D are used to explain in more detail the difference between the prior art and an embodiment of the invention.

FIG. 11A illustrates the generation of a sheared image as employed in a conventional shear-warp process where the view vector is closest to the i axis of object space. It is assumed that the view vector is close to but not parallel to the i axis in object space. As shown in FIG. 11A, the k axis is aligned to correspond to the l axis of the sheared image. Processing of the pixels of the sheared image is performed in the order represented by the arrow S starting, for example, with the voxels A. As the voxels are stored in the order (i, j, k), this means that each successive voxel required for computing the row of the pixels of the sheared image is to be found in a different plane of voxels (i.e. with significant separations in memory). In generating the pixels of the sheared image, the contribution(s) from voxels through the object are accumulated, with successive layers of voxels being processed from front to back as represented by the arrow T. Although processing is shown as being from front to back, it could alternatively be effected from back to front.

Figure 11B:
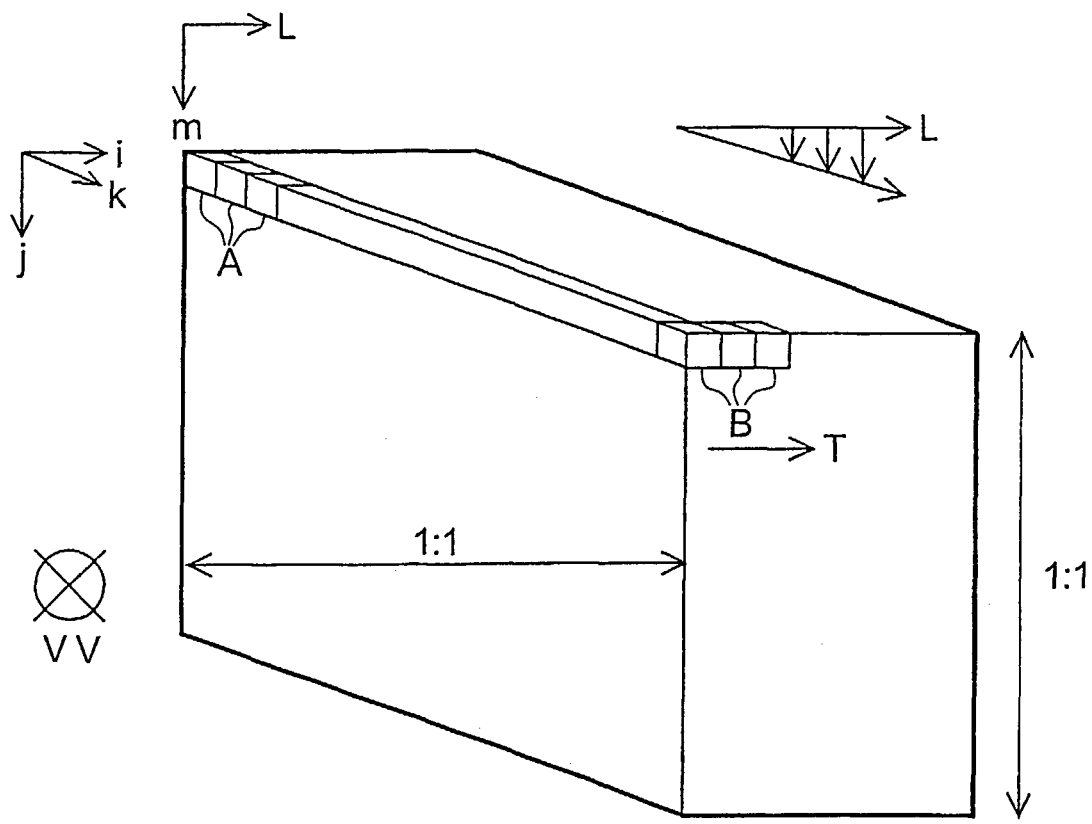

FIG. 11B illustrates the generation of a sheared image for an embodiment of the invention, assuming the same object and the same view vector that is closest to the i axis. Once again, it is assumed that the view vector is close to but not parallel to the i axis in object space. It can clearly be seen that the shear applied in FIG. 11B in an embodiment of the invention is different from that applied in FIG. 11A in the conventional shear warp process. In an embodiment of the invention, a shear is employed that maps the i axis onto the l axis of the sheared image. Processing of the pixels of a line of the sheared image in the direction T is then aligned with the organisation of voxels in memory. As the voxels are stored in the order (i, j, k), this means that each successive voxel required for computing the row of the pixels of the sheared image is to be found in closely adjacent locations in memory.

The difference between the shear of FIG. 11A and the shear of FIG. 11B could be represented as a notional additional shear AS shown in FIG. 11B. However, it should be understood that an embodiment of the invention does not need to provide two separate shear operations, but rather that a preferred embodiment of the invention employs a single shear operation that could be though of equivalent to a conventional shear plus the notional additional shear AS.

Figure 11C:
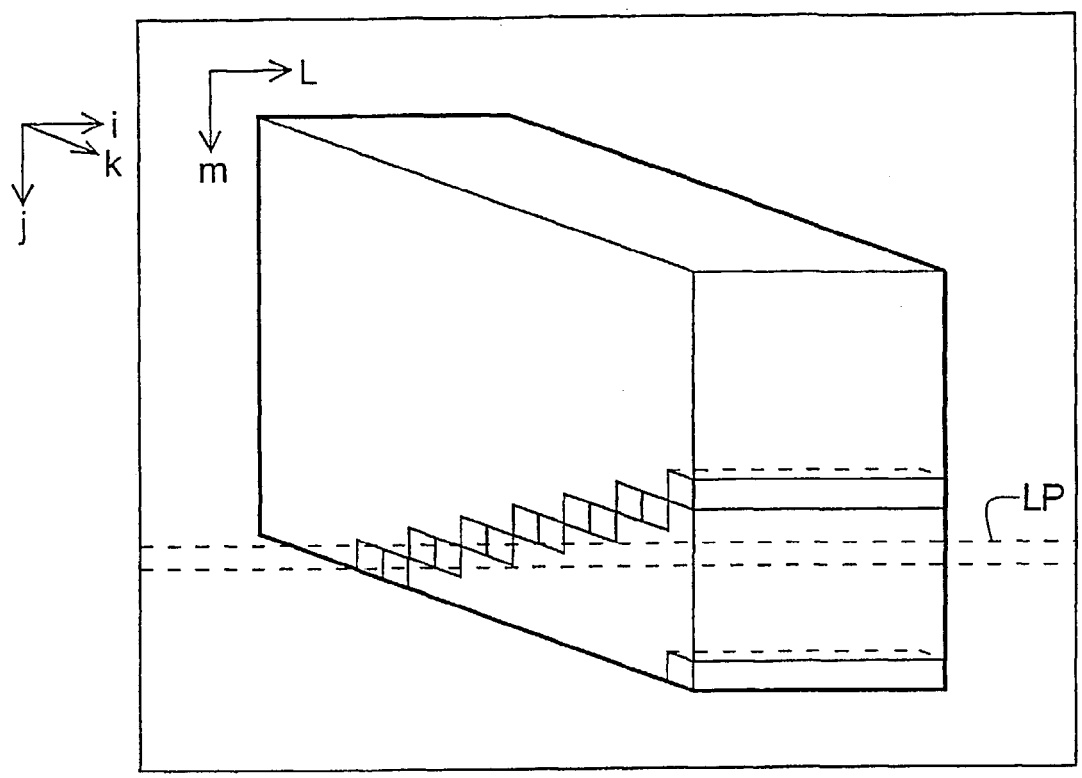

FIG. 11C illustrates the generation of a line of pixels showing the contributions from the different layers of the object. It can be seen that the rows of voxels through the object that contribute to a line of pixels LP of the sheared image steps from layer to layer (plane to plane) of the object.

The calculation of the rows of voxels of the sheared object that contribute to a line of pixels LP of the sheared image can be calculated on the fly. Alternatively, this can be precalculated and held in a record (for example a shear table) indicating the relative relationship between rows in successive planes that is required to generate a line of pixels. As the same relative relationship will apply for each line of the sheared image, the pre-calculation of this relationship, and storage in, for example, a shear table, can be an effective technique for improving processing performance. A shear table can be computed as part of the view parameter determination process 90 of FIG. 4.

Figure 11D:
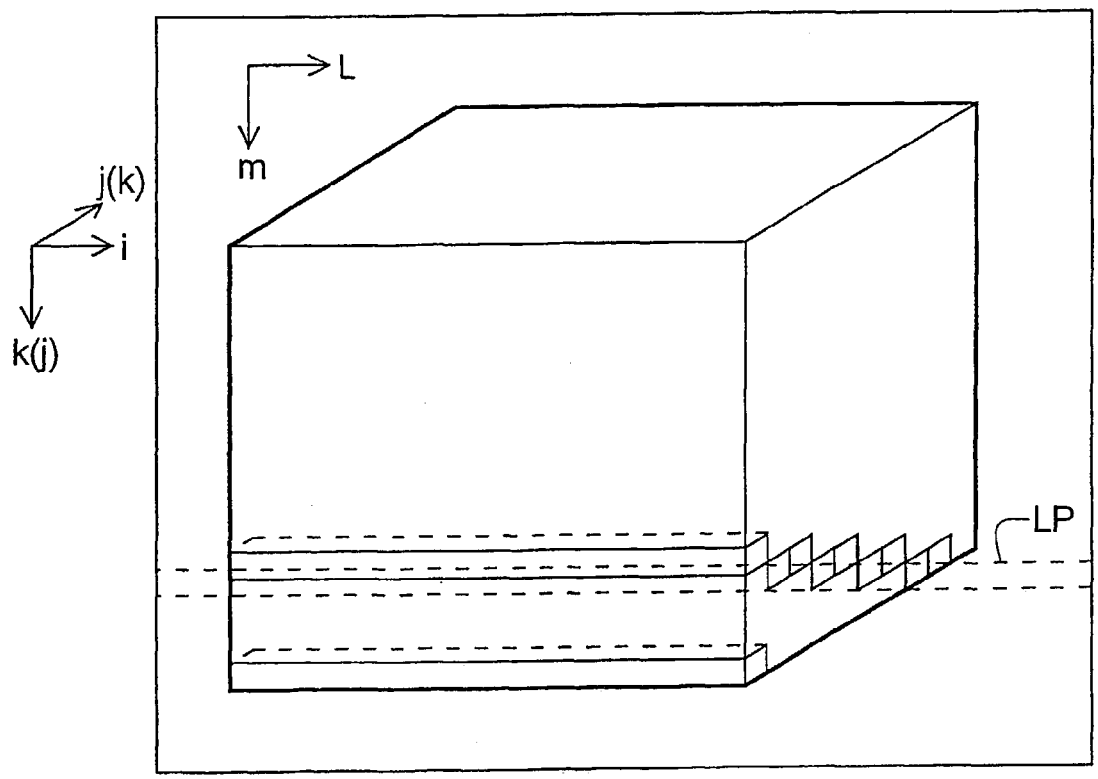

FIG. 11D illustrates the generation of the sheared image where the view direction is nearest to the j or k axes of the object space. In each case, the shear mapping is chosen such that the i axis maps onto the l axis of the sheared image space. Where the axis is nearest to the view vector, then the k axis is arranged to map to the m axis of the sheared image space. Where the k axis is nearest to the view vector, then the axis is arranged to map to the m axis of the sheared image space. FIG. 11D also shows the set of rows of voxels that map onto the line of pixels LP. It can be seen therefore, that processing of the pixels of a line LP of the sheared image in the direction T can be aligned with the organisation of the voxels in memory. As the voxels are stored in the order (i, j, k), this means that each successive voxel required for computing the row of the pixels of the sheared image is to be found in closely adjacent locations in memory.

As mentioned above, arranging that processing of voxels takes account of the storage of the voxels in memory can greatly improve processing of the image. By providing for processing in this manner, image rendering can be of a comparable speed irrespective of which axis is closest to the view vector, avoiding a "slow axis". When viewed in matrix terms, the shear is arranged such that memory access is performed preferentially according to the inner loop (i) where the matrix axes are expressed as (i, j, k).

The explanation of the generation of pixel values represented in FIGS. 11C and 11D is based on a point sampling approach where the value of one voxel per layer is taken to contribute to the value of a pixel. This will be explained in further detail with respect to FIG. 12.

Figure 12:
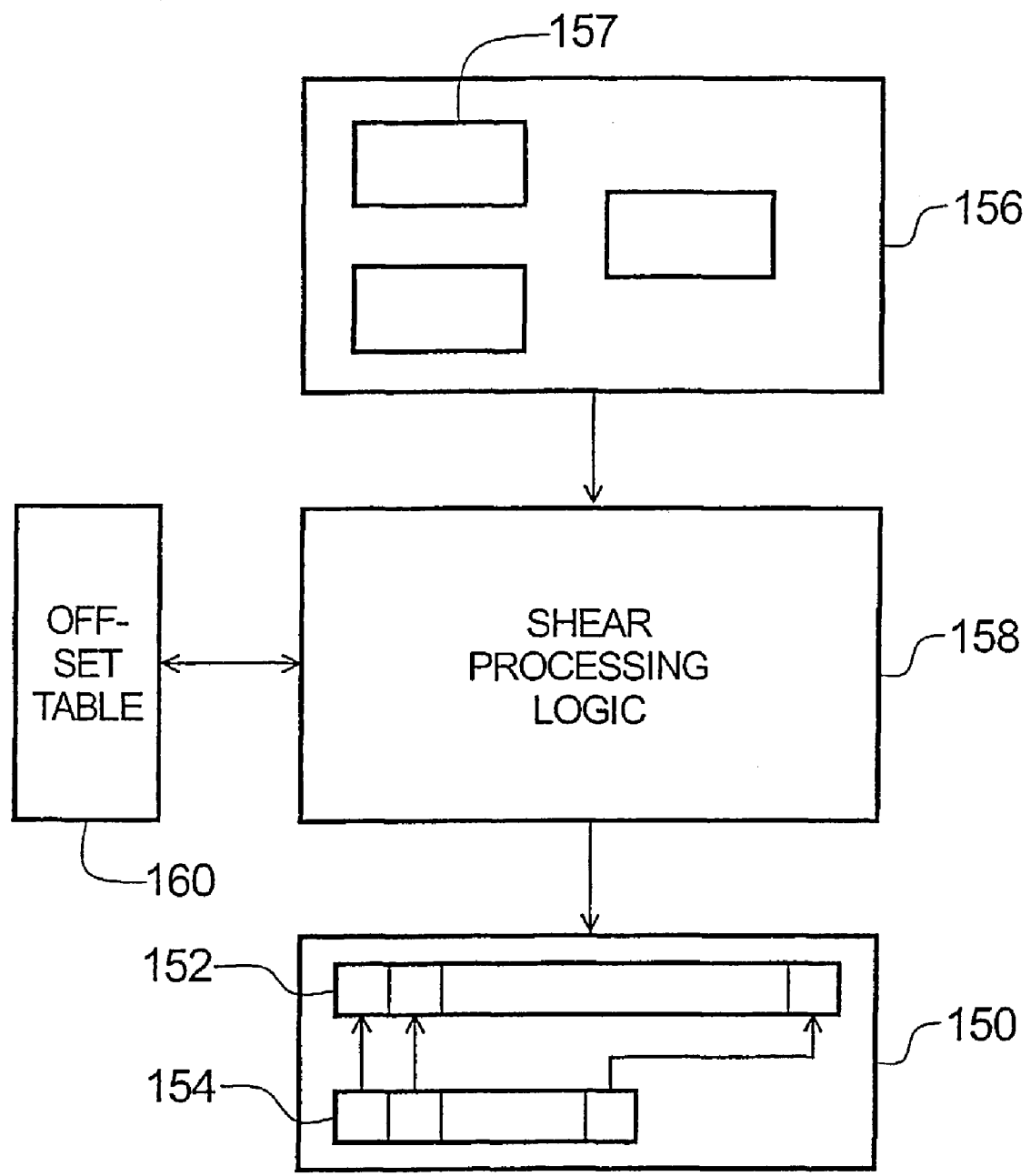
FIG. 12 illustrates a shear processing stage of the process of FIG. 4.

FIG. 12 illustrates in more detail one example of the generation of a sheared image to be stored in storage 96. The generation of the sheared image is preferably performed line by line, whereby one line of the sheared image is held in cache memory 150 in a processor, preferably in a first level cache. FIG. 12 illustrates a sheared image line buffer 152 for storing pixel values for one line of the cache storage and a saturation buffer 154 comprising one bit for each pixel to indicate whether saturation has been reached for the pixel, as will be described later. Cache storage 156, which can be second level processor cache, contains blocks of retrieved voxel data.

Sheared image generation logic 158 is responsive to shear parameters from a shear table 160 (for example as computed in a view parameter determination process 90 of FIG. 4) to access contiguous voxel storage that contain data for voxels needed for computing the pixels of the line of the sheared image data.

The shear processing logic 158 is operable to accumulate partial opacity (intensity) values of a line of pixels from the opacity values of respective sets of voxel values. A first set of voxel values (from a first row of voxels as identified using a first entry in the shear table) is stored in first pass. Then, a second set of voxel values (from a second row of voxel values as identified by a second entry in the shear table) are combined with the opacity values for the pixels, as appropriate. This process repeats for successive rows until the pixel values for the respective pixels have been accumulated. If at any time during this process, a pixel value reaches a desired degree of opacity, then a flag is set at a location in the saturation buffer for the pixel concerned to indicate that no further calculations are needed for that pixel. This approach is a bit like "early ray termination" to avoid unnecessary processing of voxels that will not contribute to a pixel of the sheared image, for example because the pixel has already reached a maximum opacity. Thus, the provision of the saturation buffer enhances processing efficiency by avoiding unnecessary data retrieval and computation operations.

Figure 13:
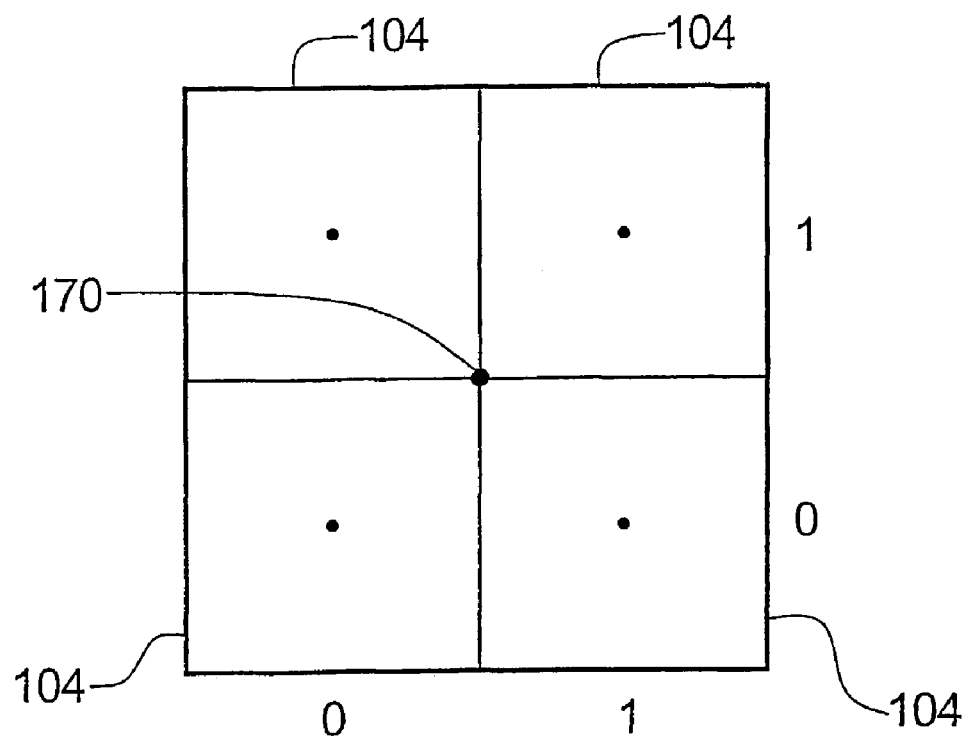
FIGS. 13 and 14 illustrates voxel interpolation for voxel to pixel mapping.

In the above description, the assumption is made that for each step through the object volume, only one voxel value is utilised (so-called point sampling). However, in an embodiment of the invention, it is also possible to factor in relative contributions of adjacent voxel values depending upon the intersection between the view vector and the centres of the voxels. As an illustration with reference to FIG. 13, a notional ray 170 parallel to the view vector for generating a pixel value passes at an intersection between four voxels (as seen looking along the view vector). In such a case, a 25% contribution from the opacity values for each of the four voxels could be used to generate a value to be added to the intensity value for the pixel concerned. The proportional contribution can be adjusted according to the relative displacements of the notional ray 170 from the respective voxel centres. To provide such proportional processing increases the processing load, but can lead to enhanced clarity and definition of a final image.

Figure 14:
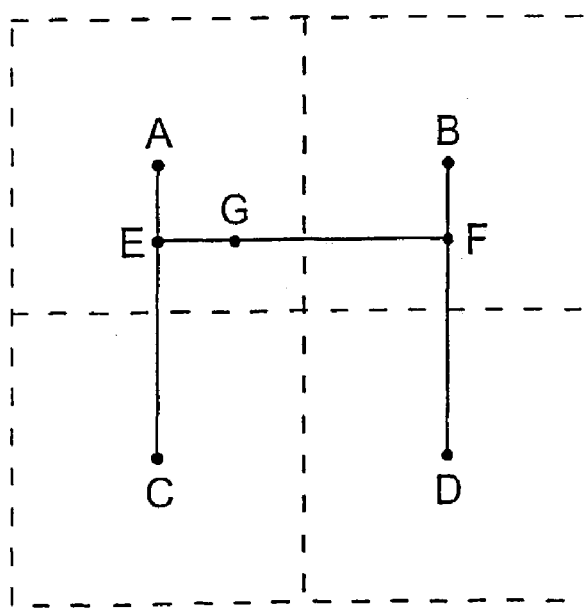

In one embodiment of the invention, the contribution of four voxels is computed by bi-linear processing, as represented in FIG. 14. In other words, the value of a notional ray 170 in FIG. 14 is determined by linear interpolation in the vertical direction (as shown in FIG. 14) followed by linear interpolation in the horizontal direction (as shown in FIG. 14), that is in accordance with the following formulae:

$$G=E(GF/EF)+F(EG/EF), \text{ where}$$

$$E=A(CE/AC)+C(AE/AC); \text{ and}$$

$$F=B(FD/BD)+D(BF/BD).$$

where A, B, C, D, E and F represent values at the respective positions shown in FIG. 14. A, B, C and D represent the centres of four voxels and G is the point at which the view vector passes the plane that includes the four voxel centres.

Figure 15:
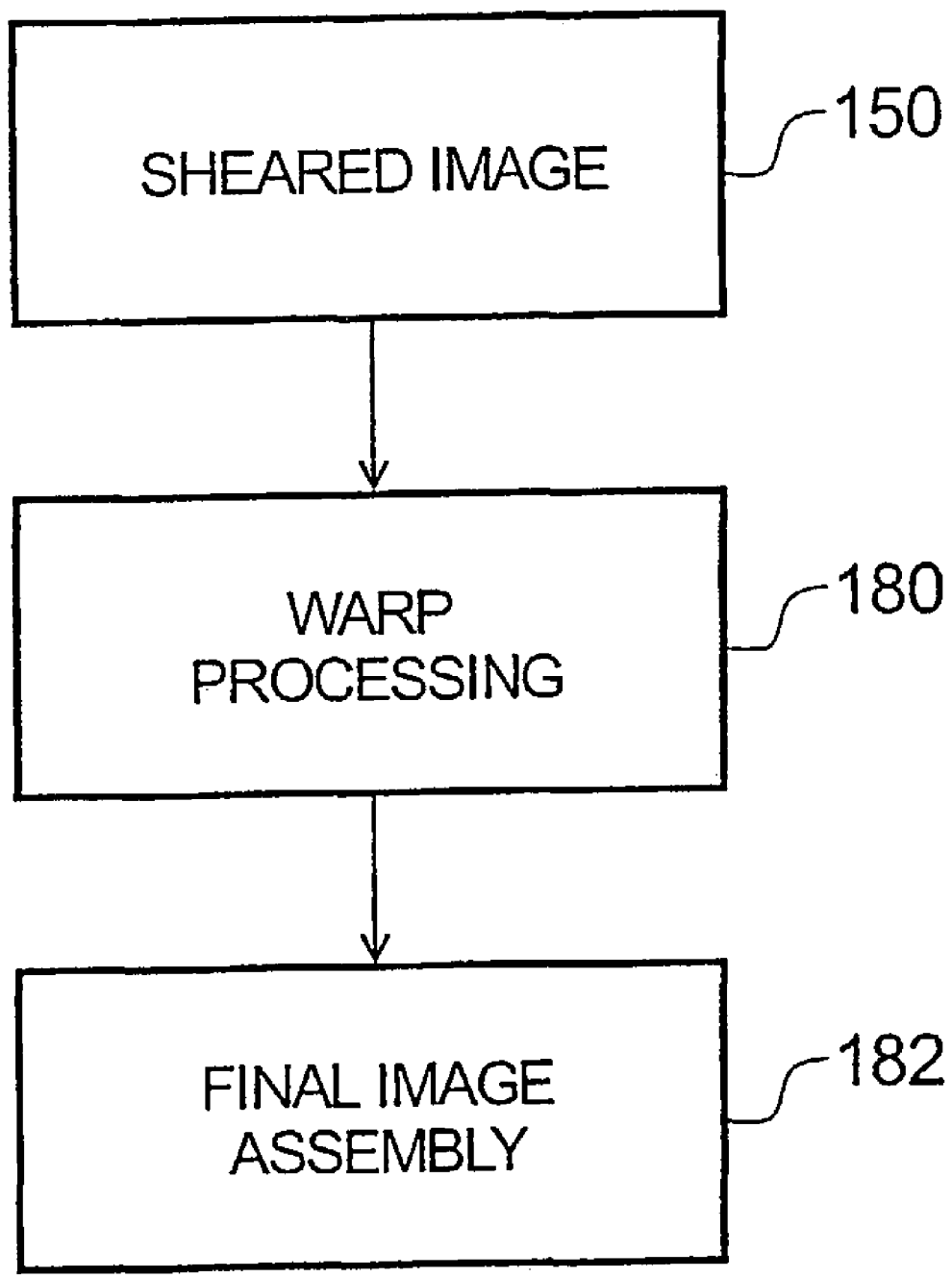
FIG. 15 illustrates a warp processing stage of the process of FIG. 4.

FIG. 15 represents the warp processing stage of 96 of FIG. 4 in more detail.

In Step 150, processing is performed to generate the sheared image.

In Step 180, warp processing takes place using matrix mathematics to provide an image rotation, scale and shear operations. Thus the position for the pixel data for each pixel of the row of the sheared image is changed in accordance with warp factors to position that pixel data at an appropriate position in the final image. In other words, the pixel values that form a horizontal row in the sheared image may not form a horizontal row in the final image.

In Step 182, final image assembly is performed. The final image can be displayed, for example, on the display device of 14 of the workstation 10 of FIG. 1, or printed, stored or transmitted to another location, workstation or the like, as required.

Thus, there has been described, a computer program and a computer-implemented system and method for generating a two-dimensional image of a volume data set representing an object volume from a selectable viewpoint. An object volume data set includes voxel values ordered by voxels along a row that extends in a first direction, rows across a plane that extends in the first direction and a second direction, and planes through an object volume that extend in the first and second directions and a third direction. In response to the definition of a view vector defining a view direction with respect to a viewpoint, shear and warp mappings are determined, as is which of the first, second and third directions is closest to the view vector. Pixels of a two-dimensional sheared image having a plurality of lines of pixels are then determined from voxel values of the object volume data set identified by the shear mapping. Where the view vector is closest to the first direction, the shear mapping maps rows of voxels in the first direction onto lines of pixels of the sheared image An output image is then determined by mapping pixels of the sheared image according to the warp mapping. This output image can be displayed, printed, sent to a remote location or otherwise communicated to a user.

Thus, for example, although the described embodiment employs a computer program operating on a conventional computer, for example a conventional computer workstation, in other embodiments special purpose hardware could be used. For example, at least some of the functionality could be effected using special purpose circuits, for example a field programmable gate array (FPGA) or an application specific integrated circuit (ASIC). Also, multi-thread processing or parallel computing hardware could be used for at least some of the processing. For example, different threads could be used to generate respective alternate rows of the sheared image.

Figure 16:
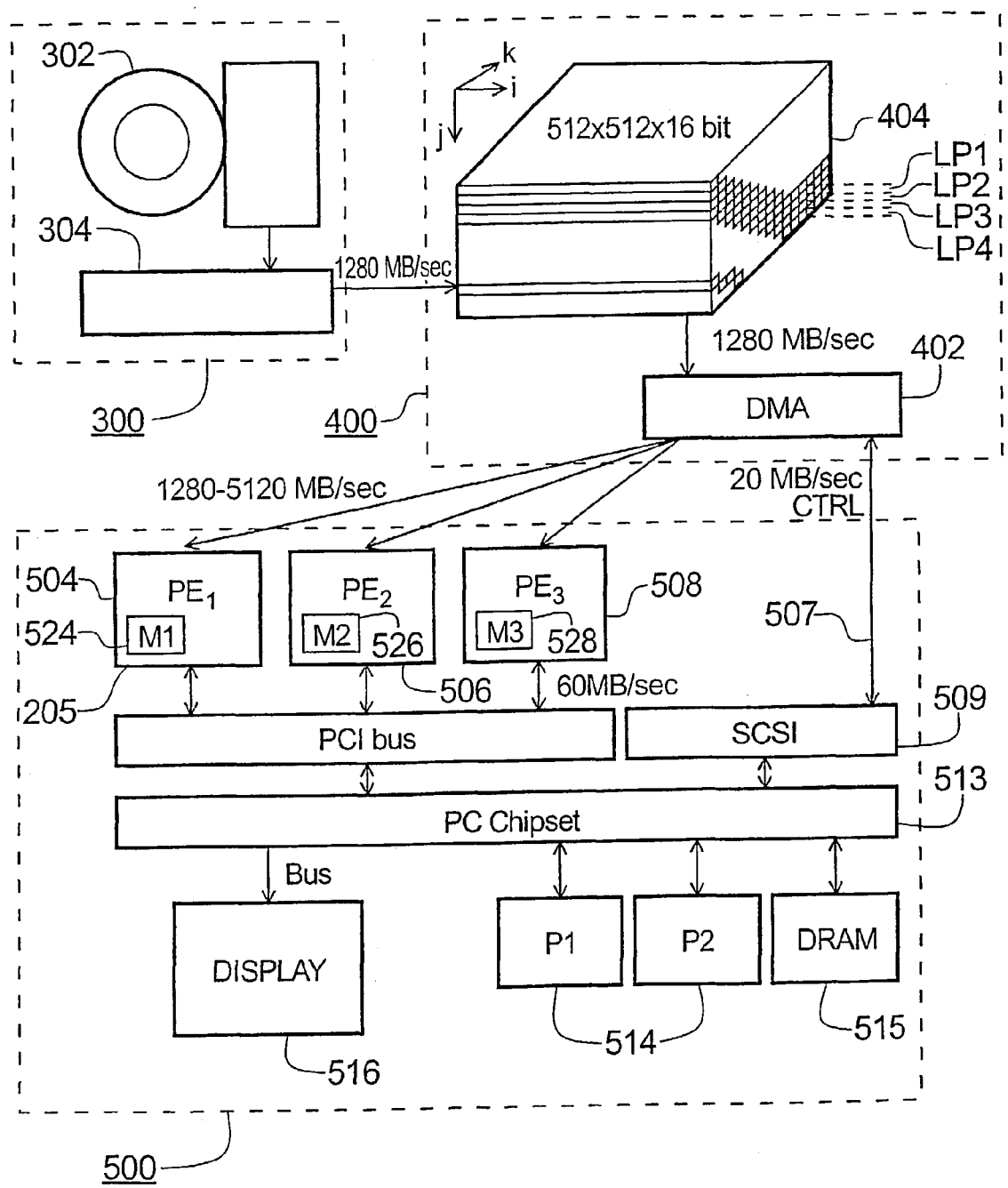
FIG. 16 shows a hardware implementation embodying the invention.

FIG. 16 shows a particularly advantageous hardware implementation embodying the invention which makes it possible to render in real-time. The figure shows a CT system 300 comprising a CT scanner 302 and a volume CT construction unit 304 operatively connected to transfer CT data to a computer system 500 via a memory unit 400 comprising a volume memory 404 and a routing unit 402 employing direct memory access (DMA). The lines of pixels are shown schematically, with the first four lines being labelled LP1, LP2, LP3 and LP4. The function of the memory unit 400 is to provide an efficient transfer the CT data from the CT system 300 to the computer system 500. It will be understood that the transfer of the CT data into the computer system 500 may be carried out in many other ways, including directly without an intermediary such as the memory unit 400.

The computer system 500 comprises a plurality of processing elements 504, 506 and 508, three of which ($PE_1$, $PE_2$ and $PE_3$) are shown, by way of example. Each processing element has local memory, for example random access memory (RAM), such as static RAM (SRAM) or dynamic RAM (DRAM). The illustrated processing elements 504, 506 and 508 have respective local memories 524, 526 and 528 (M1, M2 and M3).

The DMA routing unit 402 has data communication links to each processing element 504, 506, 508 . . . . The DMA routing unit 42 also has a data communication link 507 to an interface 509 of the computer system. The link 507 serves to carry control data relevant to the data communication from the volume memory 404 to the processing elements 504, 506, 508 . . . , as will be explained further below. The computer system 500 further comprises the following standard components: a chipset 513; a PCI bus 530 interconnecting the processing elements 504, 506, 508 . . . with the chipset 513; one or more main processors 514 (two processors P1 and P2 are shown) connected to the chipset 513; and some memory 515 (shown as DRAM) also connected to the chipset 513. The computer system 500 further comprises a display 516 connected to the chipset 513 by a bus connection.

The embodiment of FIG. 16 is based on the understanding that, by using the method of rendering voxels described further above, rows of voxels which go to make up a line of pixels in the displayed image are processed independently of the other voxels. This allows voxels associated with different lines of pixels to be processed in parallel. The embodiment of FIG. 16 is one example of how such parallel processing of the pixel line data can be carried out in practice. However, it will be understood that the underlying concept of this embodiment is that each voxel data set destined to contribute to a given pixel line in the final image can be processed independently, e.g. in parallel. The adoption of parallel processing can significantly increase the processing speed and allows real-time display using relatively modest hardware. For example, with the example system shown in FIG. 16 it should be possible to generate 3D images of 512×512× 24 bit pixels at 10 frames per second based on current personal computer (PC) performance.

Returning to the example, if n processing elements are used then n lines of pixels of the rendered image can be calculated simultaneously with each processing element 504, 506, 508 . . . being assigned to process the values of a different lines of pixels. The pixel values for each line of pixels are calculated independently by the processing elements, as described earlier. Starting with the first row of voxels in the K=0 plane, voxel values are shifted by the DMA routing unit 402 to the first processing element 504. The DMA routing unit 402 next shifts the second row of voxel data to the second processing element 506, and the third row to the third processing element 508, and so on until all the processing elements have received a row of data. Each processing element stores the received row of voxel data in its local memory 524, 526, 528 . . . which acts as a buffer.

Each processing element calculates a contribution to the pixels of its assigned pixel line from each of the voxel elements of that row. Next the DMA routing unit 402 moves on to the next plane back, that is K=1, and begins again sending voxel values of the first row in the K=1 plane to processing element $PE_1$, and for the nth row in that plane to the nth processing element, i.e. $PE_n$.

As explained earlier, to allow for the fact that overlaps of voxel rows may occur, the voxel value to contribute to a pixel may need to be calculated from a linear interpolation of neighbouring voxels, that is from four voxels. Each processing element also requires the voxel values of voxels neighbouring those in its row. Therefore, the DMA routing unit sends a voxel line to two processing elements responsible for adjacent lines and both processing elements store the data. In a specific example, each processing element is provided with sufficient local memory to store up to four rows of voxel data and one line of pixel data.

Once the contributions from a voxel row have been calculated, the voxel data is discarded from the local memory concerned, and the data for the row behind, in the next k-plane, is received and stored. This continues until final pixel values for the pixel line have been achieved, that is until the contributions from all the voxels have been added.

Once each pixel line has been calculated, this data is passed out to the chipset 513 for display on the display 516. The stored voxel data and pixel data in the local memories of the processing elements is then discarded. The process then starts again for the next pixel line.

Thus the DMA routing unit 402 will first fetch a line of pixels and ship it to, say, processing element 504. The DMA routing unit 402 ships all voxel data for the layer of the volume which will make up one line of pixels. The DMA routing unit 402 then ships voxel data for the next layer down to the next processing element 506, and so on.

The DMA routing unit 402 in a specific example is capable of fetching 1 k bytes of volume data per transaction. This corresponds to one line of 512 voxels along the i-axis. The DMA routing unit 402 receives control information from the host by the data link 507 to determine which line of voxels goes to which processing element. For this, a low bandwidth channel such as a SCSI channel may be used.

The local memory of each processing element is operable to hold: a line of pixels of the sheared image; up to four rows of voxels; as well as a simple program and parameters required for projecting voxels to pixels. Thus a small amount of local memory is sufficient, for example 32 KB–272 KB. There is no need for the processing elements to interact with each other as they do not need to exchange data in order to carry out their calculations.

It will be understood that the way in which the processing elements are connected to the host computer system may take a variety of forms. In FIG. 16, a system in which each processing element is connected to a common PCI bus is shown, but this is merely one example. An alternative is an external digital signal processor (DSP) cabinet with a single PCI interface to the host. Another alternative is a system where multiple processing elements are combined into an array clip, such as Pixel Fusion (Trademark). The rest of the host system is usually a simple PC host, but a unit system could also be used.

The system is capable of providing outstanding rendering performance compared to known systems. It should be possible to perform real-time rendering of volumes consisting of 512×512×256×16 bit voxels arriving at 10 volumes per second. In a preferred example, the system generates 3D images of 512×512×24 bit pixels at 10 frames per second, irrespective of the content of the data and the viewing parameters.

In the described embodiments, a computer implementation employing computer program code for storage on a data carrier or in memory can be used to control the operation of the processor of the computer. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

It will be appreciated that although particular embodiments of the invention have been described, many modifications/additions and/or substitutions may be made within the scope of the present invention. Accordingly, the particular example described is intended to be illustrative only, and not limitative.

REFERENCES

[1] U.S. Pat. No. 5,295,488
[2] U.S. Pat. No. 5,787,889

The invention claimed is:

1. A computer-implemented method of generating a two-dimensional image of a volume data set representing an object volume from a selectable viewpoint, the method comprising:

providing, in storage, an object volume data set comprising voxel values ordered by voxels along a row that extends in a first direction, rows across a plane that extends in the first direction and a second direction, and planes through an object volume that extends in the first and second directions and a third direction, whereby the voxel values for voxels in the first direction are stored sequentially in storage;

in response to definition of a view vector defining a view direction with respect to a viewpoint, determining shear and warp mappings and determining one of the first, second and third directions as being closest to the view vector;

deriving pixels of a two-dimensional sheared image having a plurality of lines of pixels from voxel values of the object volume data set identified by the shear mapping, wherein, irrespective of which direction is closest to the view vector, the shear mapping maps rows of voxels in the first direction onto lines of pixels of the sheared image; and deriving an output image by mapping pixels of the sheared image according to the warp mapping.

2. The method of claim 1, wherein the generation of the pixels of the two-dimensional sheared image is performed line by line of the sheared image.

3. The method of claim 1, wherein successive lines of the sheared image are held in a sheared image buffer.

4. The method of claim 1, wherein the derivation of a line of pixels of the sheared image includes identifying one or more rows of voxels in the first direction that map onto the line of pixels of the sheared image, and accumulating contributions from voxels from said one or more rows of voxels to derive respective pixel values of the line of pixels of the sheared image.

5. The method of claim 4, wherein the accumulation of contributions for a pixel of the sheared image is terminated when a value representative of a predetermined intensity or opacity is reached.

6. The method of claim 1, comprising pre-processing of the volume data set to identify voxels having voxel values that exceed a predetermined degree of opacity.

7. The method of claim 6, wherein the pre-processing comprises generating a volume data set encoded as runs of values having opacities greater than said predetermined opacity separated by skip values.

8. The method of claim 6, comprising determining a record identifying voxels with opacity values greater than the predetermined opacity.

9. The method of claim 5, wherein voxels with voxel values less than or equal to the predetermined value are ignored during the derivation of pixels of the two-dimensional sheared image.

10. The method of claim 1, wherein the object volume data set is scanned data.

11. The method of claim 10, wherein the object volume data set comprises scanned data generated using one or more of the following scanning techniques: particle and/or electromagnetic energy scanning, sound or ultrasound scanning.

12. The method of claim 1, wherein the object volume data set comprises a plurality of voxel row sets, each of which makes up a line of pixels of the sheared image, and wherein the step of deriving the pixels comprises independent processing of different ones of the voxel row sets.

13. The method of claim 12, wherein the independent processing comprises processing at least two of the voxel row sets in parallel with each other.

14. A computer program product for generating a two-dimensional image of a volume data set representing an object volume from a selectable viewpoint, the computer program comprising program code operable:

to access from storage, an object volume data set comprising voxel values ordered by voxels along a row that extends in a first direction, rows across a plane that extends in the first direction and a second direction, and planes through an object volume that extends in the first and second directions and a third direction, the voxel values for voxels in the first direction being stored sequentially in storage;

to determine, in response to definition of a view vector defining a view direction with respect to a viewpoint, shear and warp mappings and determining one of the first, second and third directions as being closest to the view vector;

to derive pixels of a two-dimensional sheared image having a plurality of lines of pixels from voxel values of the object volume data set identified by the shear mapping, wherein, irrespective of which direction is closest to the view vector, the shear mapping maps rows of voxels in the first direction onto lines of pixels of the sheared image; and to derive an output image by mapping pixels of the sheared image according to the warp mapping.

15. The computer program product of claim 14, comprising program code operable to perform the generation of the pixels of the two-dimensional sheared image line by line of the sheared image.

16. The computer program product of claim 14, comprising program code operable to store successive lines of the sheared image a sheared image buffer.

17. The computer program product of claim 14, comprising program code operable, for deriving a line of pixels of the sheared image, to identify one or more rows of voxels in the first direction that map onto the line of pixels of the sheared image, and to accumulate contributions from voxels from said one or more rows of voxels to derive respective pixel values of the line of pixels of the sheared image.

18. The computer program product of claim 17, wherein the program code is operable to terminate accumulation of contributions for a pixel of the sheared image when a value representative of a predetermined intensity or opacity is reached.

19. The computer program product of claim 14, wherein the volume data set is pre-processed to identify voxels having voxel values that exceed a predetermined degree of opacity.

20. The computer program product of claim 19, wherein the pre-processing comprises generating a volume data set encoded as runs of values having opacities greater than said predetermined opacity separated by skip values.

21. The computer program product of claim 19, wherein the computer program is operable to determine a record identifying voxels with opacity values greater than the predetermined opacity.

22. The computer program product of claim 14, wherein the computer program is operable to ignore voxels with voxel values less than or equal to a predetermined value.

23. The computer program product of claim 14, wherein the object volume data set is scanned data.

24. The computer program product of claim 23, wherein the object volume data set comprises data generated using one or more of the following scanning techniques: particle and/or electromagnetic energy scanning, sound or ultrasound scanning.

25. The computer program product of claim 14, wherein the object volume data set comprises a plurality of voxel row sets, each of which makes up a line of pixels of the sheared image, and wherein the step of deriving the pixels comprises independent processing of different ones of the voxel row sets.

26. The computer program product of claim 25, wherein the independent processing comprises processing at least two of the voxel row sets in parallel with each other.

27. The computer program product of claim 14 comprising computer program code on a carrier medium.

28. The computer program product according to claim 27, wherein the carrier medium is a storage medium.

29. The computer program product according to claim 28, wherein the carrier medium is a transmission medium.

30. A computer implemented system comprising a processor and main memory and a computer program product according to claim 14.

31. A system for generating a two-dimensional image of a volume data set representing an object volume from a selectable viewpoint, the system comprising:

storage for an object volume data set comprising voxel values ordered by voxels along a row that extends in a first direction, rows across a plane that extends in the first direction and a second direction, and planes through an object volume that extends in the first and second directions and a third direction, the voxel values for voxels in the first direction being stored sequentially in storage;

a view processor operable to determine, in response to definition of a view vector defining a view direction with respect to a viewpoint, shear and warp mappings and determining one of the first, second and third directions as being closest to the view vector;

a shear processor operable to derive pixels of a two-dimensional sheared image having a plurality of lines of pixels from voxel values of the object volume data set identified by the shear mapping, wherein, irrespective of which direction is closest to the view vector, the shear mapping maps rows of voxels in the first direction onto lines of pixels of the sheared image; and a warp processor operable to derive an output image by mapping pixels of the sheared image according to the warp mapping.

32. The system of claim 31, wherein the shear processor is operable to perform the generation of the pixels of the two-dimensional sheared image line by line of the sheared image.

33. The system of claim 31, wherein the shear processor is operable to store successive lines of the sheared image a sheared image buffer.

34. The system of claim 31, wherein the shear processor is operable, for deriving a line of pixels of the sheared image, to identify one or more rows of voxels in the first direction that map onto the line of pixels of the sheared image, and to accumulate contributions from voxels from said one or more rows of voxels to derive respective pixel values of the line of pixels of the sheared image.

35. The system of claim 34, wherein the shear processor is operable to terminate accumulation of contributions for a pixel of the sheared image when a value representative of a predetermined intensity or opacity is reached.

36. The system of claim 31, comprising a pre-processor operable to identify voxels having voxel values that exceed a predetermined degree of opacity.

37. The system of claim 36, wherein the pre-processor is operable to generate a volume data set encoded as runs of values having opacities greater than said predetermined opacity separated by skip values.

38. The system of claim 36, wherein the pre-processor is operable to determine a record identifying voxels with opacity values greater than the predetermined opacity.

39. The system of claim 31, wherein the shear processor is operable to ignore voxels with voxel values less than or equal to a predetermined value.

40. The system of claim 31, wherein the storage means comprises a main storage and a cache storage, the volume data set being held in the main storage, and wherein blocks of contiguously ordered voxel values being processed are temporarily transferred from main the storage to the cache storage.

41. The system of claim 40, wherein the cache storage is a second-level cache memory of a microprocessor.

42. The system of claim 40, wherein the cache storage is operable to hold all data required for processing at least one scan line of the two-dimensional image in memory.

43. The system of claim 31, comprising sheared image storage for storing the sheared image.

44. The system of claim 43, wherein the sheared image storage comprises a first-level cache memory of a microprocessor for accumulating a line of pixels of the sheared image, and further storage for storing complete lines of the sheared image.

45. The system of claim 31, wherein the object volume data set is scanned data.

46. The system of claim 45, wherein the object volume data set comprises scanned data generated using one or more of the following scanning techniques: particle and/or electromagnetic energy scanning, sound or ultrasound scanning.

47. The system of claim 31, wherein the storage is configured to store the object volume data set as a plurality of voxel row sets, each of which makes up a line of pixels of the sheared image, and wherein the shear processor comprises a plurality of processing elements configured to independently process different ones of the voxel row sets.

48. The system of claim 47, wherein the processing elements are configured to parallel process the voxel row sets.

49. A computer-implemented method of generating a two-dimensional output image from an object volume data set, the method comprising:

(a) providing an object volume data set comprising voxel values ordered by voxels along a row that extends in a first direction, rows across a plane that extends in the first direction and a second direction, and planes through an object volume that extends in the first and second directions and a third direction, whereby the voxel values in the first direction are stored sequentially in storage;

(b) providing a view vector and a viewpoint, defining a view direction according to the view vector and the viewpoint, and determining one of the first, second and third directions as being closest to the view vector;

(c) determining a shear mapping from the object volume data set to a two-dimensional sheared image;

(d) determining a warp mapping from the two-dimensional sheared image to a two-dimensional output image;

(e) deriving pixels of a two-dimensional sheared image having a plurality of lines of pixels from voxel values of the object volume data set identified by the shear mapping, wherein, irrespective of which direction is closest to the view vector, the shear mapping maps rows of voxels in the first direction onto lines of pixels of the sheared image; and (f) deriving the two-dimensional output image by mapping pixels of the sheared image according to the warp mapping.

* * * * *